(12) United States Patent
Douglas et al.

(10) Patent No.: US 10,771,351 B2
(45) Date of Patent: Sep. 8, 2020

(54) FAST PROVISIONING SERVICE FOR CLOUD COMPUTING

(71) Applicant: Digital River, Inc., Minnetonka, MN (US)

(72) Inventors: Ryan Patrick Douglas, Edina, MN (US); James Edward Lehnhoff, Eagan, MN (US); Michael Robert Wilson, Savage, MN (US); Lukas John Marty, Richfield, MN (US); Michael Thomas Gross, Minneapolis, MN (US); Paul Conrad Schaleger, St. Paul, MN (US)

(73) Assignee: DIGITAL RIVER, INC., Minnetonka, MN (US)

(*) Notice: Subject to any disclaimer, the term of this patent is extended or adjusted under 35 U.S.C. 154(b) by 256 days.

(21) Appl. No.: 15/290,588

(22) Filed: Oct. 11, 2016

(65) Prior Publication Data
US 2017/0034012 A1    Feb. 2, 2017

Related U.S. Application Data

(63) Continuation-in-part of application No. 13/919,695, filed on Jun. 17, 2013, now abandoned.
(Continued)

(51) Int. Cl.
*H04L 12/24* (2006.01)
*H04L 29/06* (2006.01)
(Continued)

(52) U.S. Cl.
CPC .......... *H04L 41/50* (2013.01); *H04L 41/0803* (2013.01); *H04L 41/0806* (2013.01);
(Continued)

(58) Field of Classification Search
CPC .................... H04L 29/08072; H04L 29/08081
(Continued)

(56) References Cited

U.S. PATENT DOCUMENTS 7,743,147 B2    6/2010  Suorsa
8,171,141 B1    5/2012  Offer et al.
(Continued)

OTHER PUBLICATIONS

Walker, Intelligent Domain Name System resolution for application delivery, 2011, dell.com (4 pages).*
(Continued)

*Primary Examiner* — Wing F Chan
*Assistant Examiner* — Leon Y Tseng
(74) *Attorney, Agent, or Firm* — Billion & Armitage; Richard E. Billion

(57) ABSTRACT

A cloud-based system and method for provisioning IT infrastructure systems is disclosed. The system and method provided constructs an infrastructure generally comprised of a processing component supplying the computational capacity for a platform element, comprising one or more processing elements, memory and I/O subsystems, a storage component utilizing commodity disk drives and comprised of one or more physical storage devices, and a network component providing a high speed connection among processing elements and the processing component to storage components. In addition, the system and method provide all features required for a complete, immediately usable infrastructure system including registration of IP addresses and domain names so that the user may have the system completely up and running without the aid of an administrator.

20 Claims, 28 Drawing Sheets

Related U.S. Application Data

(60) Provisional application No. 61/660,141, filed on Jun. 15, 2012, provisional application No. 62/254,837, filed on Nov. 13, 2015.

(51) Int. Cl.
  *H04L 12/911* (2013.01)
  *H04L 29/08* (2006.01)
  *H04L 29/12* (2006.01)

(52) U.S. Cl.
  CPC ...... *H04L 41/5077* (2013.01); *H04L 41/5096* (2013.01); *H04L 47/781* (2013.01); *H04L 67/16* (2013.01); *H04L 67/42* (2013.01); *H04L 61/1511* (2013.01); *H04L 61/2015* (2013.01); *H04L 61/305* (2013.01)

(58) Field of Classification Search
  USPC ........................................................ 709/223
  See application file for complete search history.

(56) References Cited

U.S. PATENT DOCUMENTS

| | | |
|---|---|---|
| 8,260,840 B1 | 9/2012 | Sirota |
| 8,495,193 B2 | 7/2013 | Kuzhiyil |
| 8,719,444 B2 | 5/2014 | Chou et al. |
| 8,819,106 B1 | 8/2014 | Sirota |
| 8,972,578 B2 | 3/2015 | Mitchell |
| 9,055,067 B1 | 6/2015 | Ward, Jr. |
| 2005/0044270 A1 | 2/2005 | Grove |
| 2010/0332629 A1 | 12/2010 | Cotugno |
| 2011/0231523 A1 | 9/2011 | Haugland et al. |
| 2011/0265164 A1 | 10/2011 | Lucovsky |
| 2012/0030672 A1 | 2/2012 | Zygmuntowicz et al. |
| 2012/0054624 A1 | 3/2012 | Owens |
| 2012/0124211 A1 | 5/2012 | Kampas |
| 2012/0131161 A1 | 5/2012 | Ferris et al. |
| 2012/0173717 A1 | 7/2012 | Kohli |
| 2012/0233117 A1 | 9/2012 | Holt et al. |
| 2012/0310880 A1 | 12/2012 | Giampaolo et al. |
| 2013/0024573 A1 | 1/2013 | Kushida |
| 2013/0117157 A1 | 5/2013 | Iyoob |
| 2013/0238802 A1 | 9/2013 | Sarikaya |
| 2013/0291052 A1 | 10/2013 | Hadar |
| 2013/0304774 A1 | 11/2013 | Tan et al. |
| 2013/0318525 A1 | 11/2013 | Palanisamy et al. |
| 2014/0075032 A1 | 3/2014 | Vasudevan |

OTHER PUBLICATIONS

"Domain Name System", captured Apr. 7, 2010, wikipedia.org (Wayback Machine archive) (13 pages).*

Darukhanawalla, "Geographically Dispersed Data Centers, Data centers and server virtualization", Network world, Sep. 15, 2009, 15-16.

* cited by examiner

2202

2302

| 3202 | | 3204 |
|---|---|---|
| DigitalRiver.Infrastructure.DASConsumption.AllowColocationOnHost | | false |
| DigitalRiver.Infrastructure.DASConsumption.Consumer | | CASS1 |
| DigitalRiver.Infrastructure.DASConsumption.OSDatastoreCount | | 1 |
| DigitalRiver.Infrastructure.DASConsumption.OSDiskCount | | 1 |
| DigitalRiver.Infrastructure.DASConsumption.SpanDatastores | | false |

| VM Hardware | |
|---|---|
| ▶ CPU | 12 CPU(s), 0 MHz used |
| ▶ Memory | 49152 MB, 0 MB used |
| ▼ Hard disk 1 | |
| Capacity | 20.00 GB |
| Location | n001_local_r0_0_1 (180.6 GB free) |
| ▼ Hard disk 2 | |
| Capacity | 227.00 GB |
| Location | n001_local_r0_0_1 (180.6 GB free) |
| ▼ Hard disk 3 | |
| Capacity | 279.00 GB |
| Location | n001_local_r0_0_2 (246.2 GB free) |
| ▼ Hard disk 4 | |
| Capacity | 279.00 GB |
| Location | n001_local_r0_0_3 (273.8 GB free) |
| ▼ Hard disk 5 | |
| Capacity | 279.00 GB |
| Location | n001_local_r0_0_4 (273.5 GB free) |
| ▼ Hard disk 6 | |
| Capacity | 279.00 GB |
| Location | n001_local_r0_0_5 (273.7 GB free) |
| ▼ Hard disk 7 | |
| Capacity | 279.00 GB |
| Location | n001_local_r0_0_6 (273.8 GB free) |

FIG. 33

FAST PROVISIONING SERVICE FOR CLOUD COMPUTING

RELATED APPLICATIONS

The present application is a continuation-in-part of U.S. patent application Ser. No. 13/919,695, filed on 15 Jun. 2013 and entitled "Fast Provisioning Service for Cloud Computing," which itself claims priority under 35 U.S.C. 119(e) of U.S. Provisional Patent Application No. 61/660,141, filed on 15 Jun. 2012 and entitled "Fast Provisioning Service for Cloud Computing." In addition, the application incorporates the subject matter, and claims priority under 35 U.S.C. 119(e) of U.S. Provisional Patent Application No. 62/254, 837, filed on 13 Nov. 2015 and entitled "Central Control of High Availability DNS Infrastructure."

FIELD OF THE INVENTION

The present disclosure relates to distributed computing, services-oriented architecture, and application service provisioning. More particularly, the present disclosure relates to infrastructure-as-a-service provisioning of virtual computing systems.

BACKGROUND OF THE INVENTION

Cloud computing is one of the fastest growing trends in computer technology. Often advertised as the "Cloud," cloud computing means slightly different things to different people depending on the context. Nevertheless, most definitions suggest that cloud computing is a compelling way to deliver computer services to business organizations, allowing for rapid scale and predictable cost modeling in the deployment and management of applications.

By one definition, cloud computing is a methodology for delivering computational resources to consumers as a single service, rather than as discrete components. Computational resources, such as physical hardware, data storage, network, and software are bundled together in predictable, measurable units and delivered to consumers as complete offerings. Often, these offerings are delivered with tools to help consumers deploy and manage their applications with ease. Applications that best take advantage of cloud computing environments can scale quickly and utilize computing resources easily everywhere the cloud computing environment exists.

Companies that build private cloud computing environments can improve the deployment time for new and growing applications, and at the same time control and better understand the cost of the services provided. Private cloud computing environments are most often built on uniform hardware, utilize virtualization software, and feature monitoring and diagnostic tools to manage and measure usage of the environment.

To better understand this model, consider a project manager asking a company's IT department for a web server for its application. In the traditional model, the project manager would have to provide information about what hardware, disk, geographic location, web server software version, etc. was required specifically for his application. He would wait for various teams to assemble the product by hand and deliver it to him for application deployment.

Public cloud computing environments offered by companies to businesses and individuals offer a complimentary cloud computing model. AMAZON WEB SERVICES™ MICROSOFT® AZURE™, and SAVVIS® Symphony are examples of such public cloud computing environments. Users consume computing resources and pay for those resources based on a uniform rate plus fees for usage. This utility model, similar to how a power company charges for electricity, is attractive to businesses seeking to operationalize certain IT costs. A savvy IT department may wish to utilize both private and public cloud computing environments to best meet the needs of business.

It traditionally takes weeks to procure and provision computing resources. Project managers, etc. determine their hardware and software requirements, create requisitions to purchase resources, and work with IT organizations to install and implement solutions. Organizations that implement a distributed computing model with a service provisioning solution can streamline this process, control cost, reduce complexity, and reduce time to solution delivery.

Currently, there are three prevailing types of cloud computing service delivery models: infrastructure-as-a-service, platform-as-a-service, and software-as-a-service. Infrastructure-as-a-service is a service delivery model that enables organizations to leverage a uniform, distributed computer environment, including server, network, and storage hardware, in an automated manner. The primary components of infrastructure-as-a-service include the following: distributed computing implementation, utility computing service and billing model, automation of administrative tasks, dynamic scaling, desktop virtualization, policy-based services and network connectivity. This model is used frequently by outsourced hardware service providers. The service provider owns the equipment and is responsible for housing, running, and maintaining the environment. Clients of these service providers pay for resources on a per-use basis. This same model may be leveraged by private organizations that wish to implement the same model for internal business units. Infrastructure-as-a-service is a foundation on which one may implement a more complex platform-as-a-service model, in which the deployment business systems may be modeled and automated on top of infrastructure resources.

An organization may use the cloud computing model to make resources available to its internal clients or external clients. Regardless of how an organization may use the infrastructure, it would be beneficial to have a system and method of deploying resources quickly and efficiently; one where design and delivery are based on performance and security criteria best suited for enterprise needs. One where the developer may merely ask for and receive a web server from IT, with time to delivery, cost of the implementation and the quality of end product predictable and repeatable with costs often lower than a traditionally supplied product. The features of the claimed system and method provide a solution to these needs and other problems, and offer additional significant advantages over the prior art.

SUMMARY

The present system and methods are related to a computerized system that implements an infrastructure-as-a-service model for a private organization. A private cloud computing platform model and a system and method for the fast provisioning of computing resources are described.

In order to most efficiently deploy cloud services to a company's private users, a fast provisioning system and method allows authorized users to create the environment they require in a minimum amount of time.

Additional advantages and features of the invention will be set forth in part in the description which follows, and in part will become apparent to those skilled in the art upon examination of the following or may be learned by practice of the invention.

BRIEF DESCRIPTION OF THE DRAWINGS

FIG. 32 is an exemplary list of parameters required to create a local storage environment.

FIG. 33 is a screen shot illustrating placement of memory on local storage drives.

DETAILED DESCRIPTION

Figure 1:
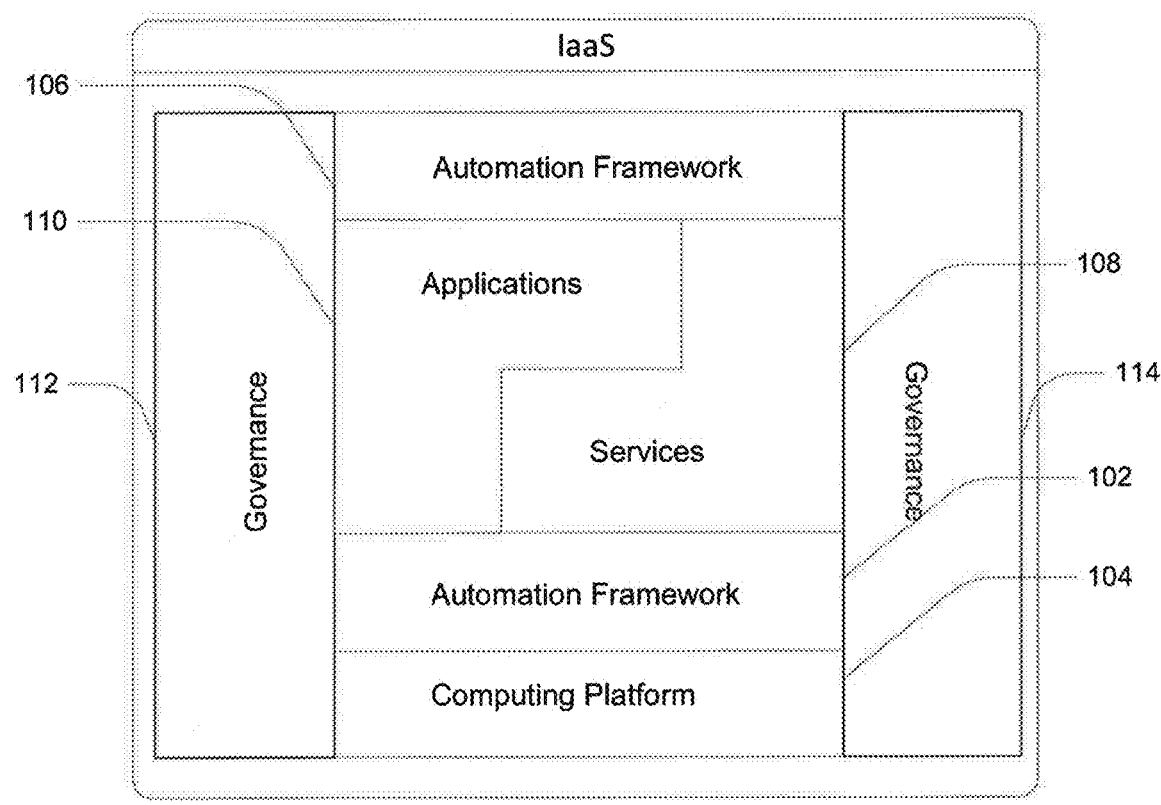
FIG. 1 illustrates infrastructure-as-a-service architecture arenas.

Listed below are a few of the commonly used terms used in describing embodiments of the inventive system and method and its context.

Common Terms and Acronyms appliance: The term appliance refers to virtual appliance that packages an application (application appliance) or a software service (service appliance).

application: An application is a software program that employs the capabilities of a computer directly to a task that a user wishes to perform.

application appliance: An application appliance is a virtual appliance that packages an application.

availability: The availability of a system is the fraction of time that the system is operational.

BIND: Name server software that implements the domain name system (DNS) protocols for the internet.

chef recipes: code scripts required for all installed components.

Container: in application development, an open specification that defines several aspects of how to run applications; a device encapsulating discrete components of application logic provisioned only with the minimal resources needed to do their job.

DASDirect: Attached Storage (DAS) is secondary storage, typically comprised of rotational magnetic disk drives or solid-state disk, which is directly connected to a processor.

DHCP: The Dynamic Host Configuration Protocol (DHCP) as specified by IETF RFC 2131 (Droms, 1997) and IETF RFC 3315 (Drom, Bound, Volz, Lemon, Perkins, & Carney, 2003) automates network-parameter assignment to network devices.

DHTS:

DNS: The Domain Name System (DNS) as specified by numerous RFC standards starting with IETF RFC 1034 (Mockapetris, RFC 1034: Domain Names—Concepts and Facilities, 1987) and IETF RFC 1035 (Mockapetris, 1987) is a hierarchical naming system for computers, services, or any resource connected to the Internet or a private network.

ESB: An enterprise service bus (ESB) is a software architecture construct that provides fundamental services for complex architectures via standards-based messaging-engine (the bus).

HTTP: The Hypertext Transfer Protocol as specified by IETF RFC 2616 (Fielding, et al., 1999).

HTTPS: HTTP over TLS as specified by IETF RFC 2818 (Rescorla, 2000).

IaaS: Infrastructure as a Service (IaaS) is the delivery of computer infrastructure (typically a platform virtualization environment) as a service. Infrastructure as a Service may be implemented either privately or publicly.

IP: The Internet Protocol as specified by IETF RFC 791 (Postel, 1981) or IETF RFC 2460 (Deering & Hinden, 1998).

ISA: An instruction set architecture (ISA) is the part of the computer architecture related to programming, including the native data types, instructions, registers, addressing modes, memory architecture, interrupt and exception handling, and external I/O. An ISA includes a specification of the machine language implemented by a particular processor.

NTP: The Network Time Protocol as specified by IETF RFC 1305 (Mills, 1992) for synchronizing the clocks of computer systems over packet-switched, variable-latency data networks.

processor: The term "processor" refers to the Central Processing Unit (CPU) of a computer system. In most computer systems that would be considered for inclusion within a Infrastructure-as-a-service implementation, the processor is represented by a single integrated circuit (i.e. a "chip").

RFC: Request for Comments (RFC), a memorandum published by the Internet Engineering Task Force (IETF) describing standards related to the Internet and Internet technologies. Not all RFC's are standards; others may simply describe methods, behaviors, research or innovations applicable to the Internet.

service: A service is a mechanism to enable access to a set of capabilities, where the access is provided using a prescribed interface and is exercised consistent with constraints and policies as specified by the service description (OASIS, 2006). Frequently, the term is used in the sense of a software service that provides a set of capabilities to applications and other services.

service appliance: A service appliance is a virtual appliance that packages a software service.

SLA: Service Level Agreement is a negotiated agreement between a service provider and its customer recording a common understanding about services, priorities, responsibilities, guarantees, and warranties and used to control the use and receipt of computing re-sources.

SMPA: symmetric multiprocessing architecture (SMPA) is a multiprocessor computer architecture where two or more identical processors can connect to a single shared main memory. In the case of multi-core processors, the SMP architecture applies to the cores, treating them as separate processors.

SOA: Service Oriented Architecture.

Striping: a way to improve performance in a data center by laying out data sequentially across an array of disks. It improves performance by moving data from each of the disks in an array at the same time, however, it decreases reliability; if a single drive in the stripe fails, the array cannot function.

virtual appliance: A virtual appliance is a software application or service that is packaged in a virtual machine format allowing it to be run within a virtual machine container.

VLAN: A virtual local area network (VLAN) is a group of hosts with a common set of requirements that communicate as if they were attached to the same broadcast domain, regardless of their physical location. A VLAN has the same attributes as a physical LAN, but it allows end stations to be grouped together even if they are not located on the same network switch. VLANs are as specified by IEEE 802.1Q (IEEE, 2006).

VMDKs: A file format that describes containers for virtual hard disk drives to be used in virtual machines.

Embodiments of the present invention may now be described more fully hereinafter with reference to the accompanying drawings, in which some, but not all, embodiments are shown. The invention may be embodied in many different forms and should not be construed as limited to the embodiments set forth herein. Although the disclosure primarily describes the claimed system and method in the terms and context of a private IaaS platform (private cloud), it is equally applicable to a public cloud made available to external clients, or a configuration and client base that is a combination of the two.

Exemplary IaaS architectural concepts are illustrated in FIG. 1. A set of automation framework layers may bracket the portfolio of software services 108 and applications 110 created by the inventive system and method. A lower automation layer 102 integrates to the processes on the underlying elastic computing platform 104 that produces virtual systems, and in many cases are transforming data asserted in the lower layers to be available to the upper automation framework component. The upper automation layer 106 provides the capability to reconfigure or modify the operating environment in applications and systems as operating parameters and requirements change. There is governance on both sides of the platform/automation/guests/automation framework. These can be thought of as a left governance layer 112 consisting of mechanical best practices, guides to providing reliability, resiliency, and performance; and a right governance layer 114 which may be the audit/security/integrity requirements and guides, dealing with the rest of the deployed system. The platform 104 provides the computational, communication, storage and management infrastructure within which the services 108 and applications 110 are run.

The described computing platform provides several beneficial characteristics, including allowing the use of primarily commodity hardware packaged in small units that permit easy horizontal scaling of the infrastructure; virtualization technology that may be used to abstract away much of the specifics of hardware topology and provide elastic provisioning; SLA monitoring and enforcement; and resource usage metering supporting chargeback to platform users.

Figure 2:
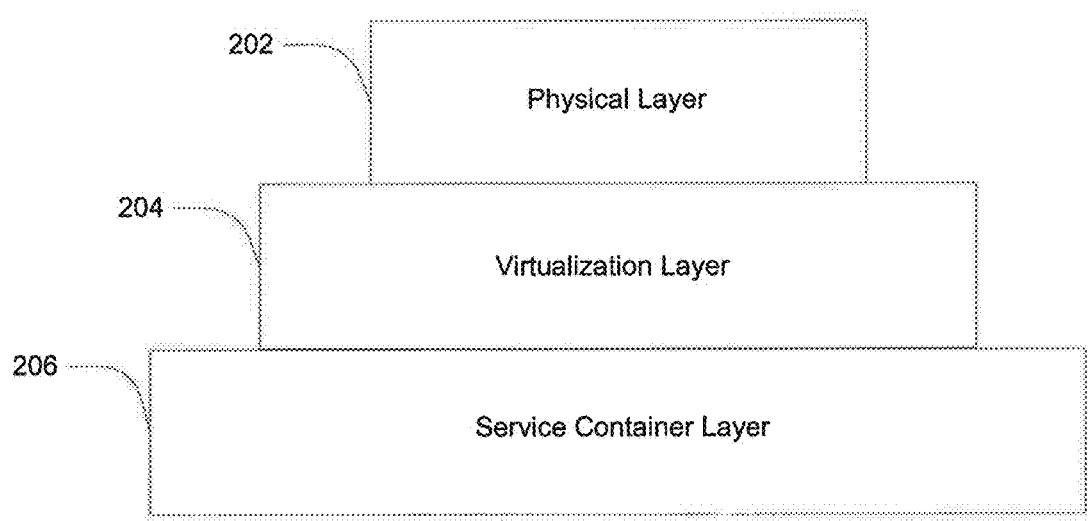
FIG. 2 illustrates an infrastructure-as-a-service computing platform.

Computing platform 104 architecture is comprised of a Physical Layer 202, a Virtualization Layer 204, and a Service Container Layer 206, as is illustrated conceptually in FIG. 2. The Physical Layer 202 consists of the hardware resources; the Virtualization Layer 204 consists of software for virtualizing the hardware resources and managing the virtualized resources; and the Service Container Layer 206 consists of a standard configuration of system services that provide a container in which application appliances and service appliances run. The computing platform 104 provides a horizontally scalable infrastructure that is highly available in aggregate but not necessarily highly available at a component level.

Figure 3:
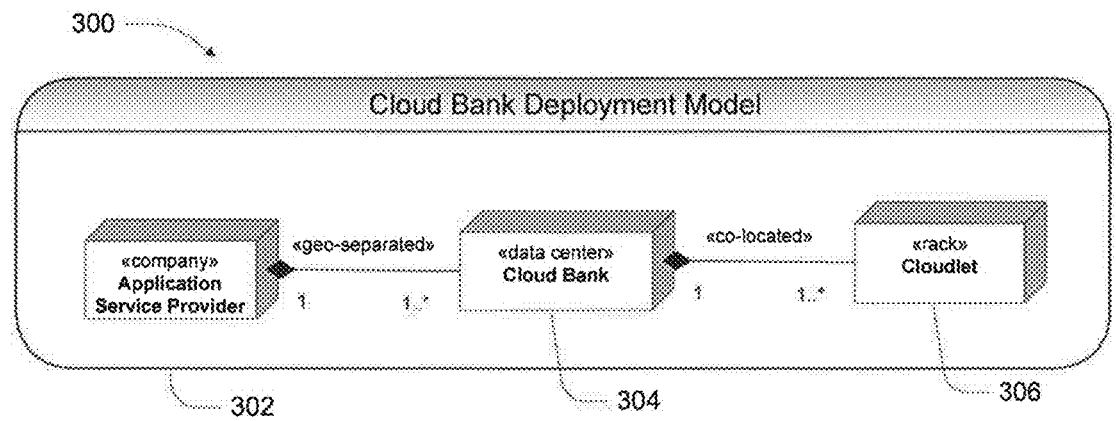
FIG. 3 illustrates a cloud bank deployment model.

FIG. 3 illustrates a cloud bank deployment model 300. An ecommerce or other network-based service provider 302 maintains a data center with cloud banks 304, each cloudbank in the computing platform has a cloudlet 306 as a unit of capacity. A cloudlet 306 is comprised of a standardized configuration of hardware, virtualization and service container components. It is intended that cloudlets 306 can stand alone, either in a provider's data center or in a co-location facility. Cloudlets 306 are general purpose, not being tuned to the needs of any particular application or service, and are not intended to be highly reliable. Therefore, applications 110 and services 108 whose availability requirements exceed the availability of a cloudlet 306 must stripe the application across a sufficient number of cloudlets 306 to meet their needs. Within a cloudlet 306, appliances have low latency, high throughput communication paths to other appliances and storage resources within the cloudlet.

A collection of cloudlets 306 in the same geographical location that collectively provide an availability zone is called a cloudbank 304. A cloudbank 304 is sized to offer sufficient availability to a desired quantity of capacity, given a cloudlet 306 lack of high availability. A single data center can and often should contain multiple cloudbanks 304. The cloudbanks 304 within a data center should not share common resources, like power and internet (extra-cloudbank) connectivity, so that they can be taken offline independently of one another.

As was described above, cloudlets 306 represent units of standard capacity containing storage, processing and networking hardware, coupled with a virtualization layer. When aggregating cloudlets 306 into cloudbanks 304, the network resources (firewalls, routers, load balancers, and enterprise service bus (ESB) devices) are typically teamed, storage elements clustered and processor elements pooled to increase the capacity of the resources being virtualized.

Figure 4:
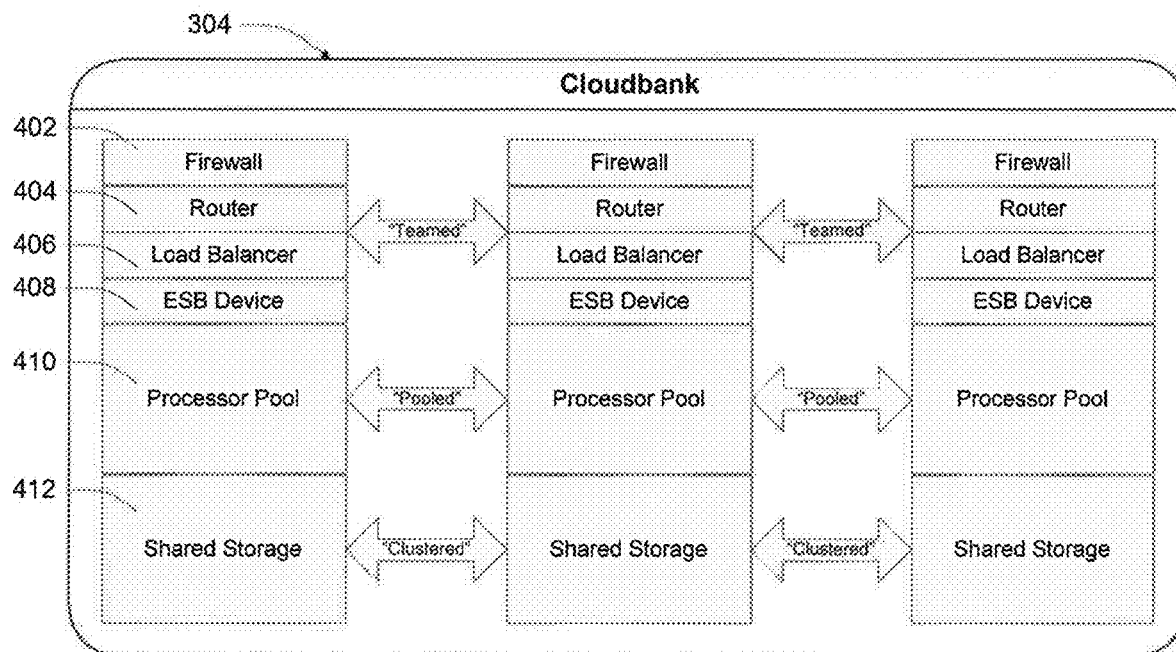
FIG. 4 is a conceptual diagram of exemplary cloudbank resources.

FIG. 4 is a conceptual diagram of exemplary cloudbank 304 resources. Components include firewall 402, router 404, load balancer 406, ESB device 408, processor pools 410 and shared storage clusters 412. Routers 404 and load balancers 406 are teamed across all cloudlets 106 in the cloudbank 304. The processor 410 elements are pooled to increase the capacity of the resources being virtualized.

Figure 5:
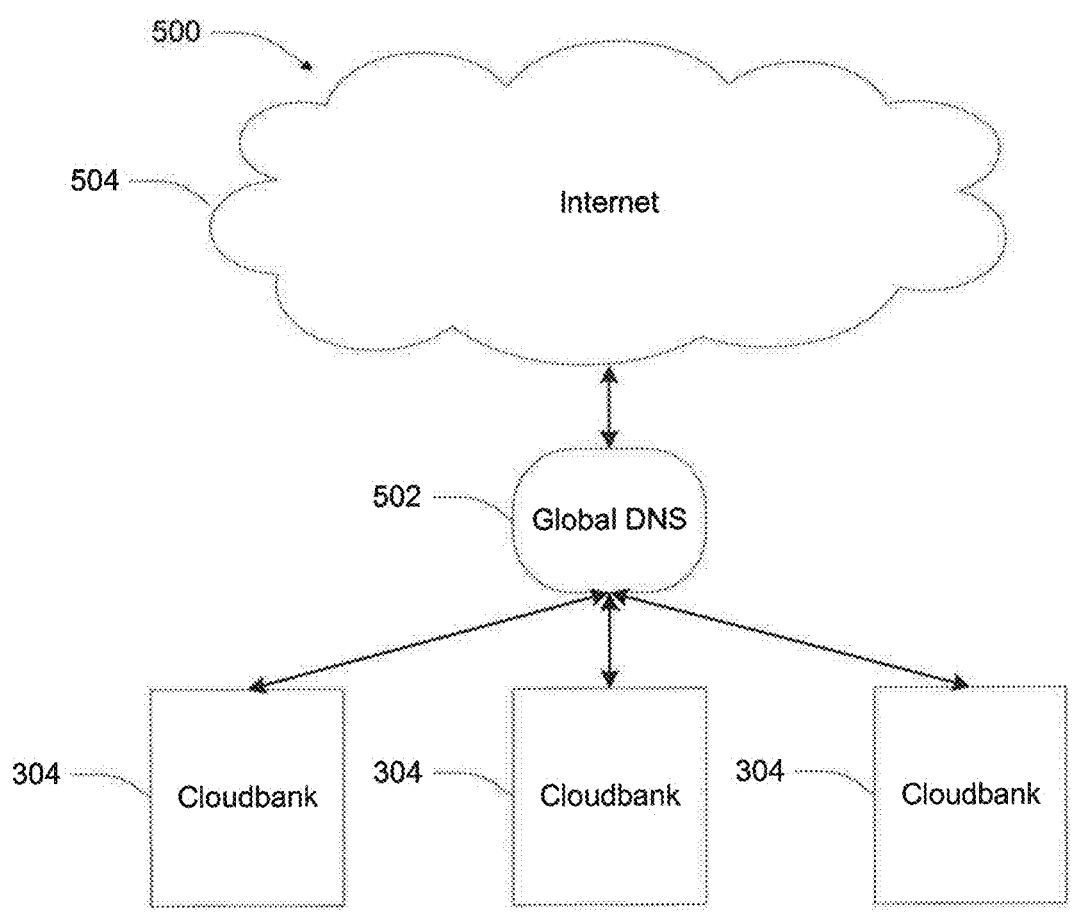
FIG. 5 is a schematic cloud comprised of cloud banks.

FIG. 5 is a schematic cloud 500 comprised of cloudbanks 304. External to the cloudbanks is some form of intelligent DNS 502; in other words, a DNS server that utilizes some form of network topology-aware load-balancing to minimize the network distance between a client and a cloudbank resident resource. In addition, it utilizes some awareness of the availability of a cloudbank resource to avoid giving a client the address of a dead resource. This can be referred to as a private cloud global DNS server. Communications are made over a network, such as the internet 504. Such a DNS server will be discussed in more detail below.

As will be discussed further below, applications 110 and services 108 may be packaged as appliances using one of the virtual machine formats supported by the automation framework 102, 106. Appliances package an operating system image and the virtualization layer should support a variety of operating systems, thereby allowing the appliance designer wide latitude to select the operating system most appropriate for the appliance.

Appliances that are well-designed for IaaS may use distributed computing techniques to provide high aggregate availability. Further, well-designed appliances may support cloning, thereby allowing the automation framework 102, 106 to dynamically provision new appliance instances. While the platform 104 may provide a general-purpose computing platform that is not optimized for any specific service or application there are some workload characteristics that are prevalent. Specifically, workloads tend to favor integer performance over floating point performance and single thread performance over multi-threaded performance. Workloads tend to be memory intensive as opposed to CPU intensive. They are often I/O bound, primarily trying to access slow (external) network connections for slow mass storage (disk, often via a database system). Certain workloads (such as distributed file systems) will benefit greatly from having Direct Access Storage (DAS).

Physical Layer

Referring again to FIG. 3, the basic component of the Physical Layer 202 of Infrastructure-as-a-service is the cloudlet 306. A cloudlet 306 is comprised of a collection of processing, storage, ESB and networking components or elements. Cloudlet 306 components are based upon, for the most part, general-purpose commodity parts.

Processing elements supply the computational capacity for the cloudlet 306. They are typically "blade" or "pizza box" SMP systems with some amount of local disk storage. Processing elements in Infrastructure-as-a-service may utilize a commodity processor design whose ISA is widely supported by different software technology stacks and for which many vendors build and market systems. A processing element generally consists of one or more processors, memory and I/O subsystems.

Each cloudlet 306 may have one storage element that provides a pool of shared disk storage. Storage elements utilize commodity disk drives to drive down the cost of mass storage. A storage element (singular) may be comprised of multiple physical storage devices. Processing elements may be connected to one another and to storage elements by a high speed network element. A network element (singular) may be comprised of multiple physical network devices.

Cloudlets 306 may be combined together into cloudbanks 304. Cloudbanks 304 provide both capacity scale out, as well as reliability improvement. Some resources, like power and internet connectivity are expected to be shared by all cloudlets 306 in a cloudbank 304, but not be shared by different cloudbanks 304. This means that high availability (four nines or more) is obtained by spreading workload across cloudbanks 304, not cloudlets 306.

Virtualization Layer

The Virtualization Layer 204 of Infrastructure-as-a-service abstracts away the details of the Physical Layer 202 providing a container in which service 108 and application 110 appliances, represented as system virtual machines, are run. The Virtualization Layer 204 may consist of three parts: system virtualization, storage virtualization, and network virtualization.

System virtualization may be provided by a software layer that runs system virtual machines (sometimes called hardware virtual machines), which provide a complete system platform that supports the execution of a complete operating system, allowing the sharing of the underlying physical machine resources between different virtual machines, each running its own operating system. The software layer providing the virtualization is called a virtual machine monitor or hypervisor. A hypervisor can run on bare hardware (so called, Type 1 or native VM) or on top of an operating system (so called, Type 2 or hosted VM). There are many benefits to system virtualization. A few notable benefits include the ability for multiple OS environments to coexist on the same processing element, in strong isolation from each other; improved administrative control and scheduling of resources; intelligent placement, and improved load balancing, of a workload within the infrastructure; improved ease of application provisioning and maintenance; and high availability and improved disaster recovery.

Figure 6:
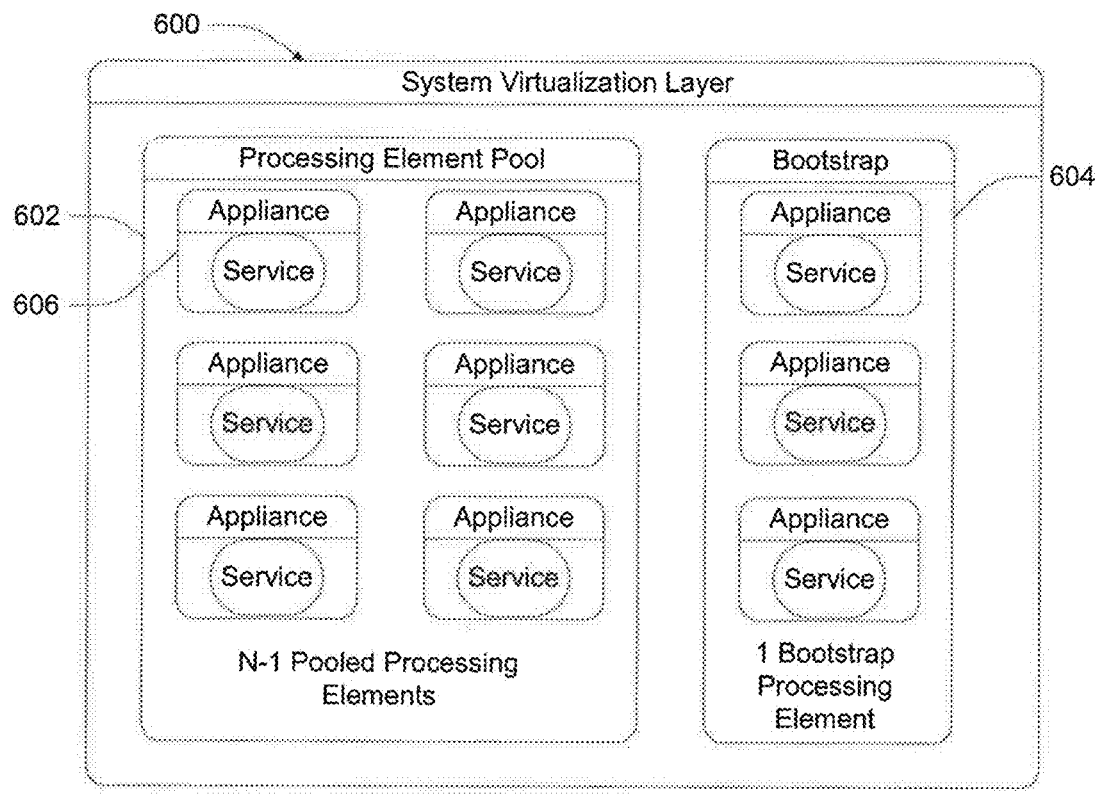
FIG. 6 is a system virtualization model.

The virtualization layer 600 illustrated in FIG. 6 treats the collection of processing elements comprising a cloudbank 304 as a pool of resources to be managed in a shared fashion. The system virtualization layer is illustrated with a processing element pool 602 and a bootstrap processing element 604.

In a preferred embodiment, services 108 and applications 110 are packaged as appliances 606. As discussed above, an appliance 606 is a virtual machine image that completely contains the software components that realize a service 108 or application 110. The ideal appliance 606 is one that can be cloned in a simple, regular and automated manner, allowing multiple instances of the appliance 606 to be instantiated in order to elastically meet the demands of the workload.

Appliances 606 will typically be associated with an environment that has common access control and scheduling policies. Typical environments are production, staging, system test, and development. System rules and governance policies 112, 114 determine access and resource availability. Development personnel may have free reign to access resources in the development environment, while only select production support personnel may have access to resources in the production environment. When multiple environments are hosted on the same hardware, the production environment may be given the highest scheduling priority to access the resources, while the development environment might have the lowest scheduling priority to accessing resources. In IaaS, the system virtualization layer 204 can support multiple environments within the same resource pool.

The system virtualization layer 204 typically provides features that improve availability and maintainability of the underlying hardware, such as the capability to move a running virtual machine from one physical host to another within a cluster of physical hosts to, for example, facilitate maintenance of a physical host; the capability to move a running virtual machine from one storage device to another to, for example, facilitate maintenance of a storage device; automatic load balancing of an aggregate workload across a cluster of physical hosts; and the capability to automatically restart a virtual machine on another physical host in a cluster in the event of a hardware failure.

Storage virtualization may be provided by either system virtualization software or by software resident on the network attached shared storage element. In the first case, many virtualization layers expose the notion of a virtual disk, frequently in the form of a file (or set of files) which appear to a guest operating system as a direct attached storage device. The second case is seen, for example, when a logical device is exposed as by Network File System (NFS) or Common Internet File System (CIFS) server.

Network virtualization is provided by either system virtualization software or by software resident on the attached network element. In the first case, many virtualization systems utilize the notion of a "virtual network device", frequently in the form of a virtual NIC (Network Interface Card) or virtual switching system which appear to a guest operating system as a direct attached network device. The second case is seen, for example, when a logical device is exposed as a virtual partition of a physical Network Element via software configuration.

Service Container Layer

Figure 7:
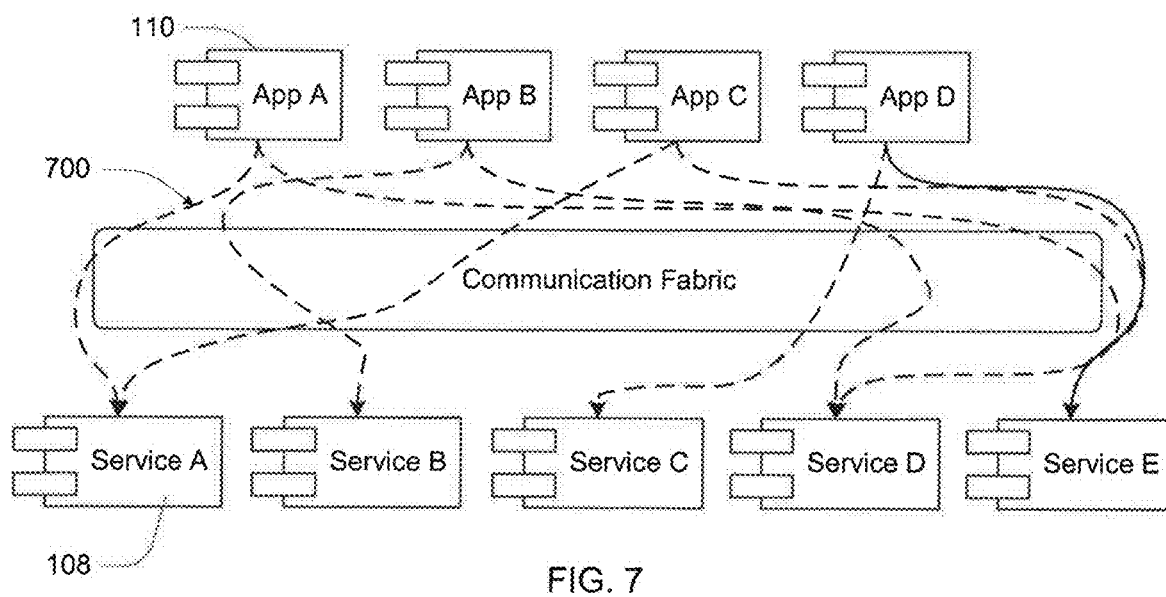
FIG. 7 depicts an Infrastructure-as-a-service communication fabric.

FIG. 7 illustrates an exemplary IaaS communication fabric 700. A cloudbank 304 hosts a suite of virtual appliances 606 that implement an ecosystem of applications 110 and services 108. For the purposes of this specification, an application 110 is a software component that may be accessed directly from outside of the cloud, often by a user. A typical example of an application 110 is a web site that is accessed directly from a browser. In contrast, a service 108 may be a software component that is typically invoked by applications 110 themselves often resident within the IaaS cloud. Services 108 may not be accessible directly, but only by accessing the IaaS communication fabric 700. The communication fabric 700 provides a common place for expressing policies and monitoring and managing services. The term communication fabric may be synonymous with ESB and in this document we use the terms interchangeably. When an application 110, whether external or internal to the IaaS cloud, invokes a service 108 it may do so by sending the request to the communication fabric which proxies the request to a backend service as in FIG. 7. Applications 110 may be public and services 108 may be private. Both services 108 and applications 110 may be realized by a collection of virtual appliances 606 behind an appliance load balancer, as is discussed below and illustrated in FIG. 8. This collection of virtual appliances 606 and load balancer (which may be software load balancer realized by another virtual appliance 606) is called an appliance zone (or simply zone in contexts where there is no ambiguity) and it may be associated, one to one, with a virtual LAN. Note that the appliance zone should be able to span all the cloudlets 306 in a cloudbank 304; hence, a VLAN is a cloudbank-wide 304 resource. A cloudbank load balancer may sit at the front of the cloudbank 304 to direct traffic to application zones or the ESB, as appropriate.

Figure 8:
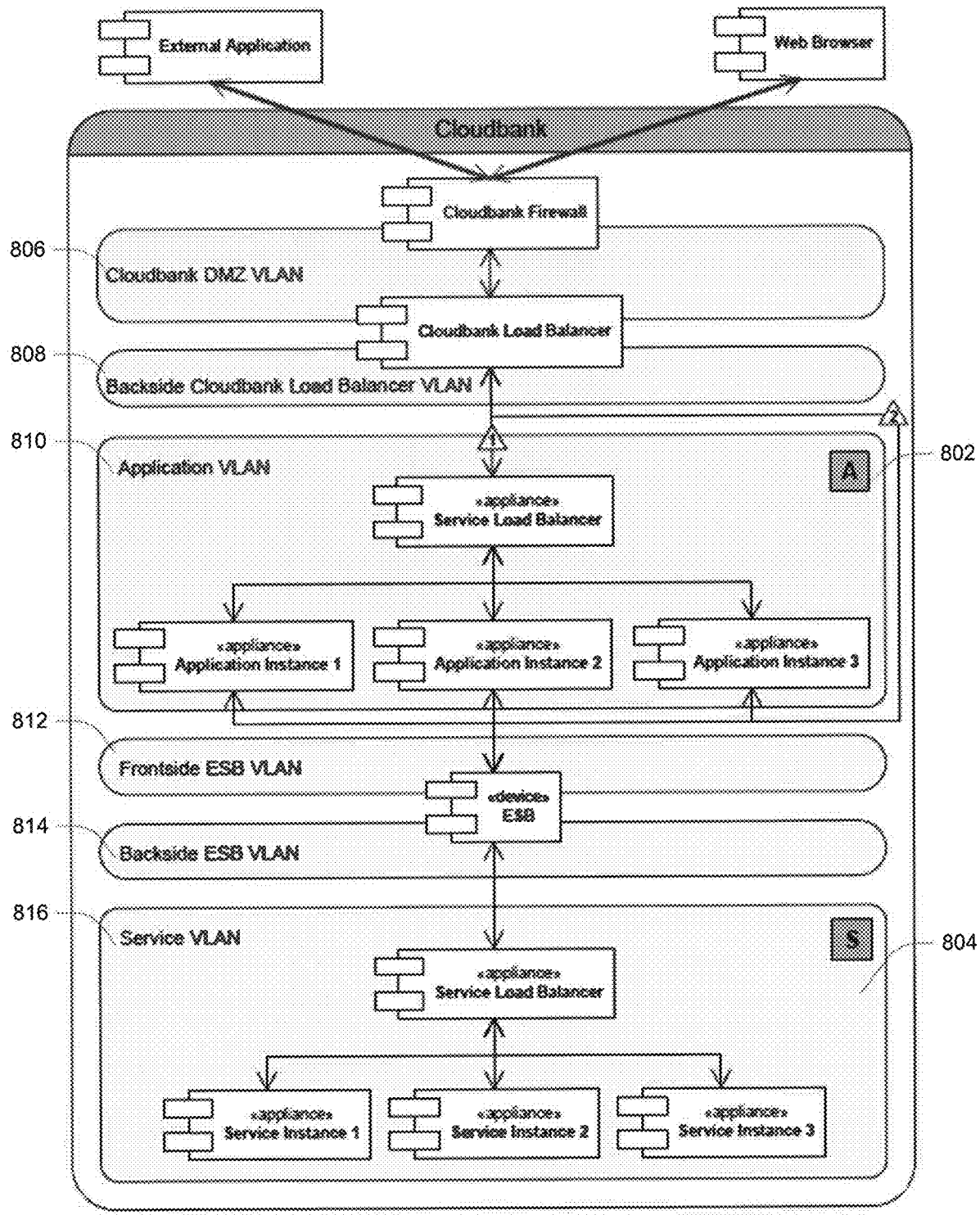
FIG. 8 depicts the logical organization of cloudbank virtual appliances.

FIG. 8 depicts the logical organization of the cloudbanks 304 virtual appliances and load balancing components to handle traffic for applications 106 (labeled by route 1 on the figure) and services 104 (labeled by route 2 on the figure). The box labeled A 802 represents an application zone, while the box labeled S 804 represents a service zone. Also shown are examples of management VLANS that are also found in the infrastructure, including cloudbank DMZ VLAN 806, backside cloudbank load balancer VLAN 808, Application VLAN 810, frontside ESB VLAN 812, backside VLAN 816 and service VLAN 816.

Thus far, it has been a challenge to get such a system up and running. What is required is an automated system and method for provisioning such cloud components on demand. The automated and elastic provisioning provided in this disclosure provides a solution to this problem and offers other advantages over the prior art.

Automated and Elastic Provisioning

An important feature of a preferred embodiment of an infrastructure-as-a-service system and method is the support for automated and elastic provisioning, which enables significantly improved IT efficiencies in managing the infrastructure. Also known as "fast provisioning," automated and elastic provisioning greatly improves the time required to set up and productionize computing infrastructure. Automated provisioning is the use of software processes to automate the creation and configuration of zones and "insertion" and "removal" of a container into the cloud. Elastic provisioning is the use of software processes to automate the addition or removal of virtual appliances within a zone in response to the demands being placed upon the system.

Some of the resources that an automated provisioning system and method manage include:
1. a catalog of virtual appliances,
2. an inventory of network identifiers: MAC addresses, IP addresses and hostnames
3. network router and ESB device configurations The naming and identification conventions that are adopted are preferably "friendly" to automation. Within the appliance zone, each virtual appliance may be allocated a unique IP address. The IP address allocated to a virtual machine must remain the same, regardless of where the virtualization layer places the virtual appliance within the cloudbank. The zone exposes the IP address of the appliance load balancer as the external IP address of the zone's application or service to its clients. For service zones, the "client" is always the ESB. Although not required by IEEE's 802.1Q standard (IEEE, 2006), it is expected that each VLAN is mapped to a unique IP subnet. Therefore, like VLANs, IP subnets are cloudbank-wide resources. IP addresses for a cloud-bank are managed by a cloudbank-wide DHCP server to which DHCP multicast traffic is routed by a DHCP proxy in the cloudbank router. The DHCP service is responsible for managing the allocation of IP addresses within the cloudbank.

Figure 9:
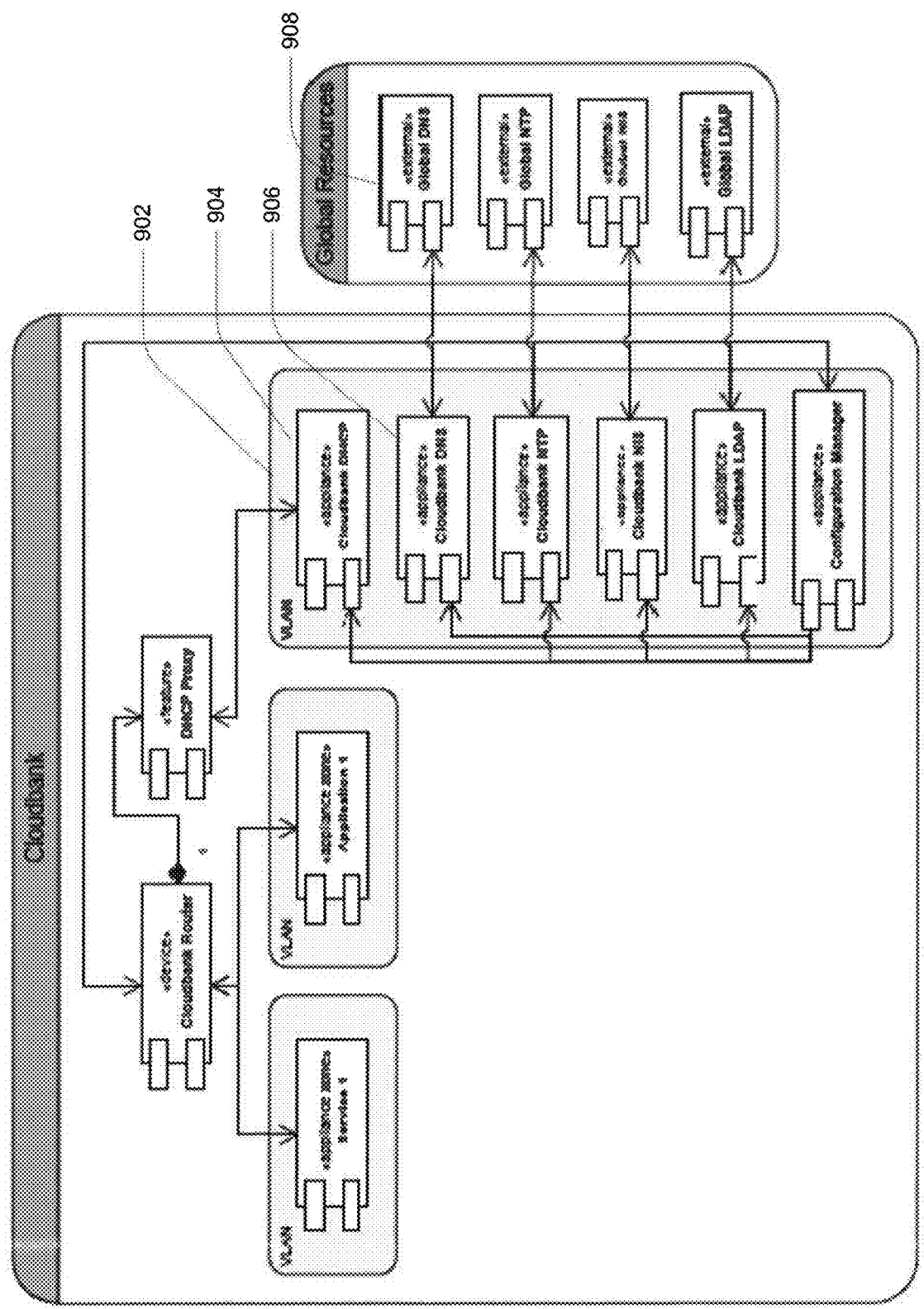
FIG. 9 illustrates the cloudbank management VLAN.

Referring to FIG. 9, the VLAN at the right of the figure is called the cloudbank management VLAN 902 and it contains a number of appliances that provide capabilities for the Service Container Layer 206. The Cloudbank DHCP appliance 904 implementing the DHCP service is shown in the figure.

Sometimes it is necessary for an appliance running in one cloudbank 304 to be able to communicate directly to its peer appliances running in other cloudbanks (appliances implementing Distributed Hash Tables (DHT)s or internal message buses need to do this). Therefore, the IP allocation scheme probably cannot impose the same set of private IP addresses to each cloudbank 304, but instead must allow some form of "template" to be applied to each cloudbank 304. Each cloudbank would apply a common allocation "pattern" that results in unique addresses (within the environment infrastructure) for each cloudbank 304.

Host and Domain Name Management

FIG. 9 also shows a cloudbank DNS appliance 906 in the management VLAN. It performs all name resolutions within the cloudbank 304. It is the authoritative DNS server for the cloudbank's 304 domain. A Global DNS 908, also illustrated in FIG. 10, exists outside the IaaS cloud. It may serve as the authoritative DNS server for a global IaaS domain namespace ("svccloud.net"). A Global DNS server 908 should be capable of performing "location aware" ranking of translation responses, ordering the response list according to the network distance or geographical proximity of the resource (a cloudbank 304) to the client, with those resources residing closer to the client being returned before resources that are farther from the client. A Global DNS 908 should also be able to filter its response based upon the availability of the resource as determined by a periodic health check of the cloudbank 304 resources.

Cloudbank DNS servers 906 must have secondary instances for high availability. Furthermore, since the primary cloudbank DNS 906 runs inside a virtualization container that refers to names that the cloudbank DNS 906 is responsible for translating, failures may not be correctable ("chicken and egg" problems) without a reliable secondary. Therefore, a cloudbank DNS 906 server must have secondary instances and at least two secondary instances must reside outside the cloudbank 304. A recommended configuration is to run one secondary in another cloudbank 304 and a second in a highly available DNS host altogether external to the cloud.

Figure 10:
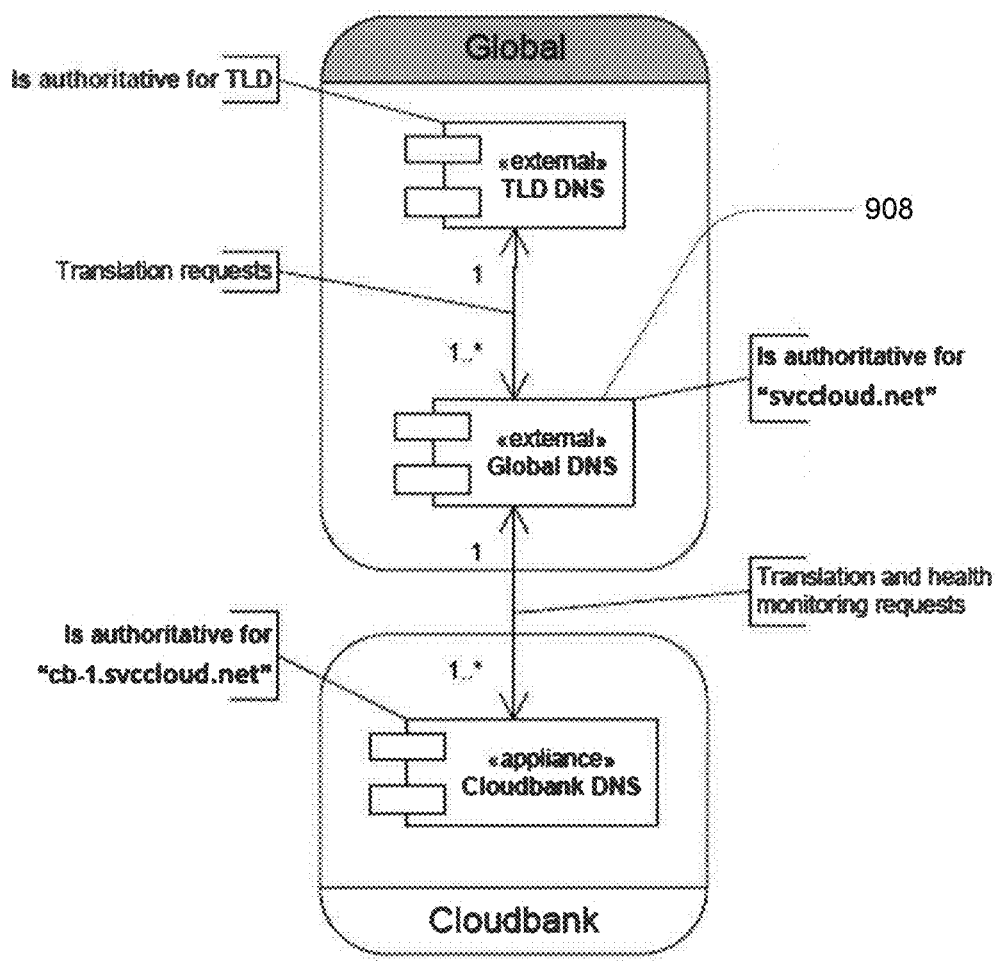
FIG. 10 illustrates the global DNS servers for infrastructure-as-a-service name resolution.

Uniform naming of resources is important to ease automated and elastic provisioning. FIG. 10 illustrates an exemplary configuration of DNS servers for DNS name resolution. An exemplary naming convention is described in Table 1, below.

TABLE 1

A DNS Naming convention

| DNS Name | Description |
|---|---|
| svccloud.net | Domain name of the cloud as a whole. The global DNS server is responsible for performing name resolution for this domain. |
| cb-1.svccloud.net | Domain name of cloudbank one. The cloudbank DNS is responsible for performing name resolution for this domain. Each cloudbank is assigned a decimal identifier that uniquely identifies it within the cloud. |
| z-1.cb-1.svccloud.net | Domain name of the appliance zone within one cloudbank one. The cloudbank DNS is responsible for performing name resolution for this domain. Each zone is assigned a decimal identifier that uniquely identifies it within the cloudbank in which it resides. |
| a-1.z-1.cb-1.svccloud.net | Host name of appliance one within appliance zone one of cloudbank one. The cloudbank DNS is responsible for resolving this name. Each appliance is assigned a decimal identifier that uniquely identifies it within the appliance zone in which it resides. |
| {resource}.svccloud.net | Global name of a resource within the cloud. These names are resolved by the global DNS to a list of cloudlet specific resource names (A records). In a preferred embodiment, the global DNS can order the returned names by network distance or geographical proximity of the client to a cloudbank. Additionally, it is desirable for the Global DNS server to be able to "health check" the cloudbank names to avoid sending a client an unavailable endpoint. |
| esb.svccloud.net | Global host name of an ESB resource within the cloud. This name is resolved by the global DNS to a list of cloudbank specific ESB resource addresses |
| app-foo.svccloud.net | Global host name of an application called "app-foo" within the cloud. This name is resolved by the global DNS to a list of cloudlet specific "app-foo" resource addresses |
| service-bar.svccloud.net | Global host name of a service called "service-bar" within the cloud. This name is resolved by the global DNS to a list of cloudlet specific "service-bar" resource addresses. |
| {resource}.cb-1.svccloud.net | Host name of a resource within cloudbank one. These names are resolved by the cloudbank DNS to a list of addresses of the resource (usually the load balancers fronting the resource). |
| esb.cb-1.svccloud.net | Host name of an ESB resource within cloudbank one. This name is resolved by the cloudbank DNS to a list of cloudbank specific addresses for the load-balancers fronting the ESB devices. |
| app-foo.cb-1.svccloud.net | Host name of an application called "app-foo" within cloudbank one. This name is resolved by the cloudbank DNS to a list of cloudbank specific addresses for the load-balancers fronting the application appliances. |
| service-bar.cb-1.svccloud.net | Host name of a service within cloudbank one. This name is resolved by the cloudbank DNS to a list of cloudbank specific addresses for the load-balancers fronting the ESB devices. |

Figure 11A:
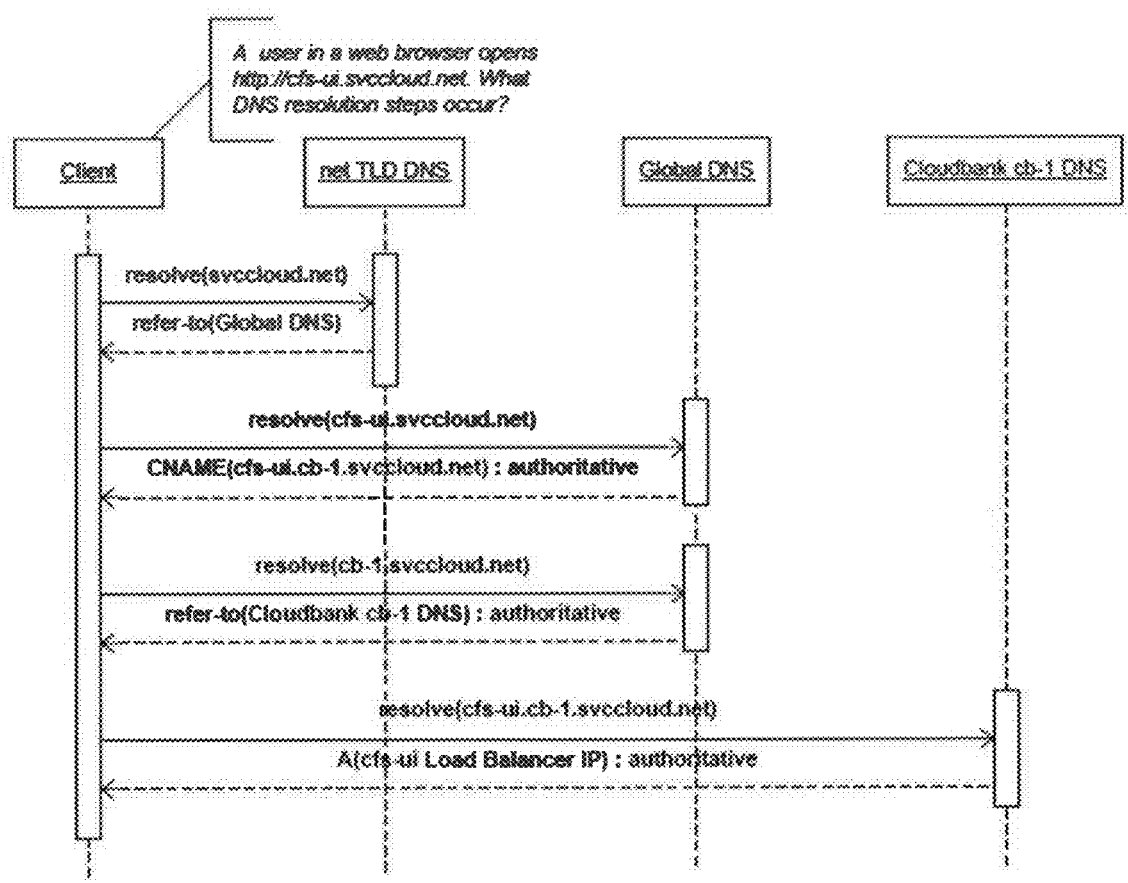
FIG. 11a is a sequence diagram illustrating DNS resolution of a global application.
Figure 11B:
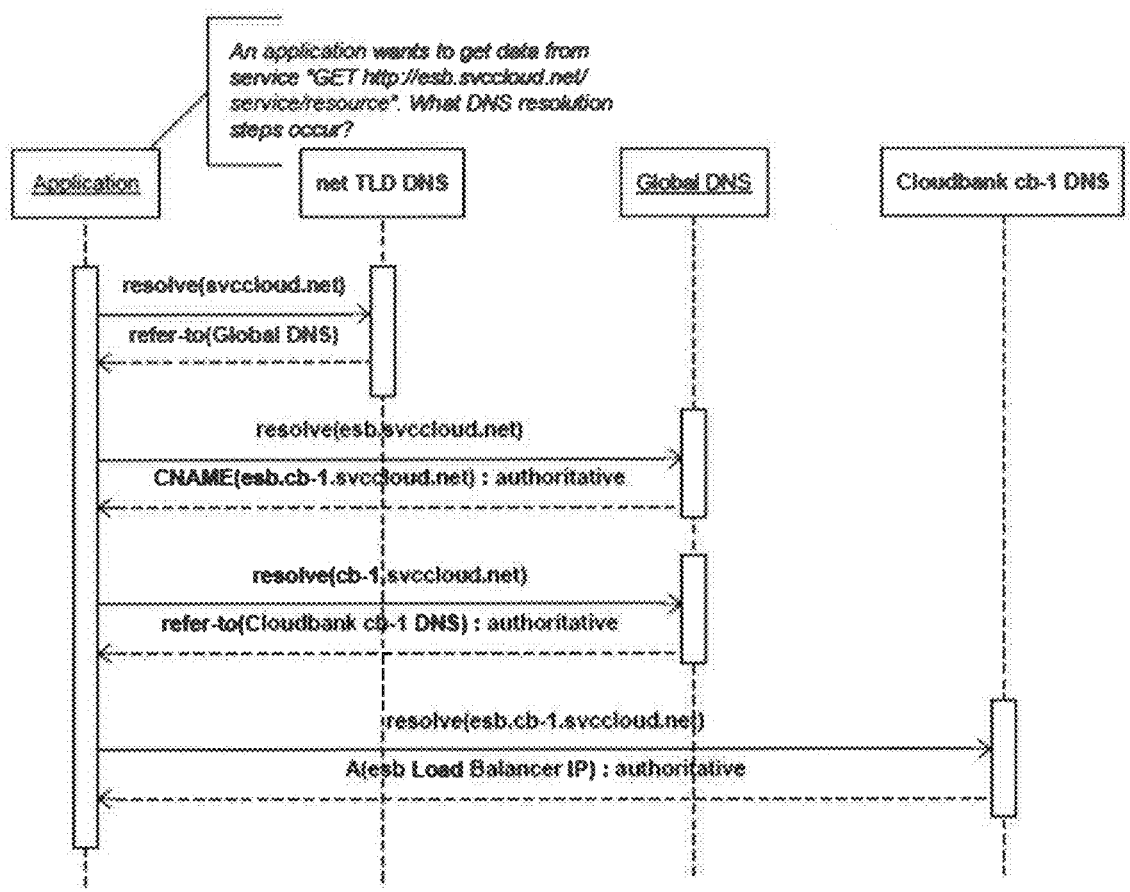
FIG. 11b is a sequence diagram illustrating DNS resolution of a service call via ESB.
Figure 34:
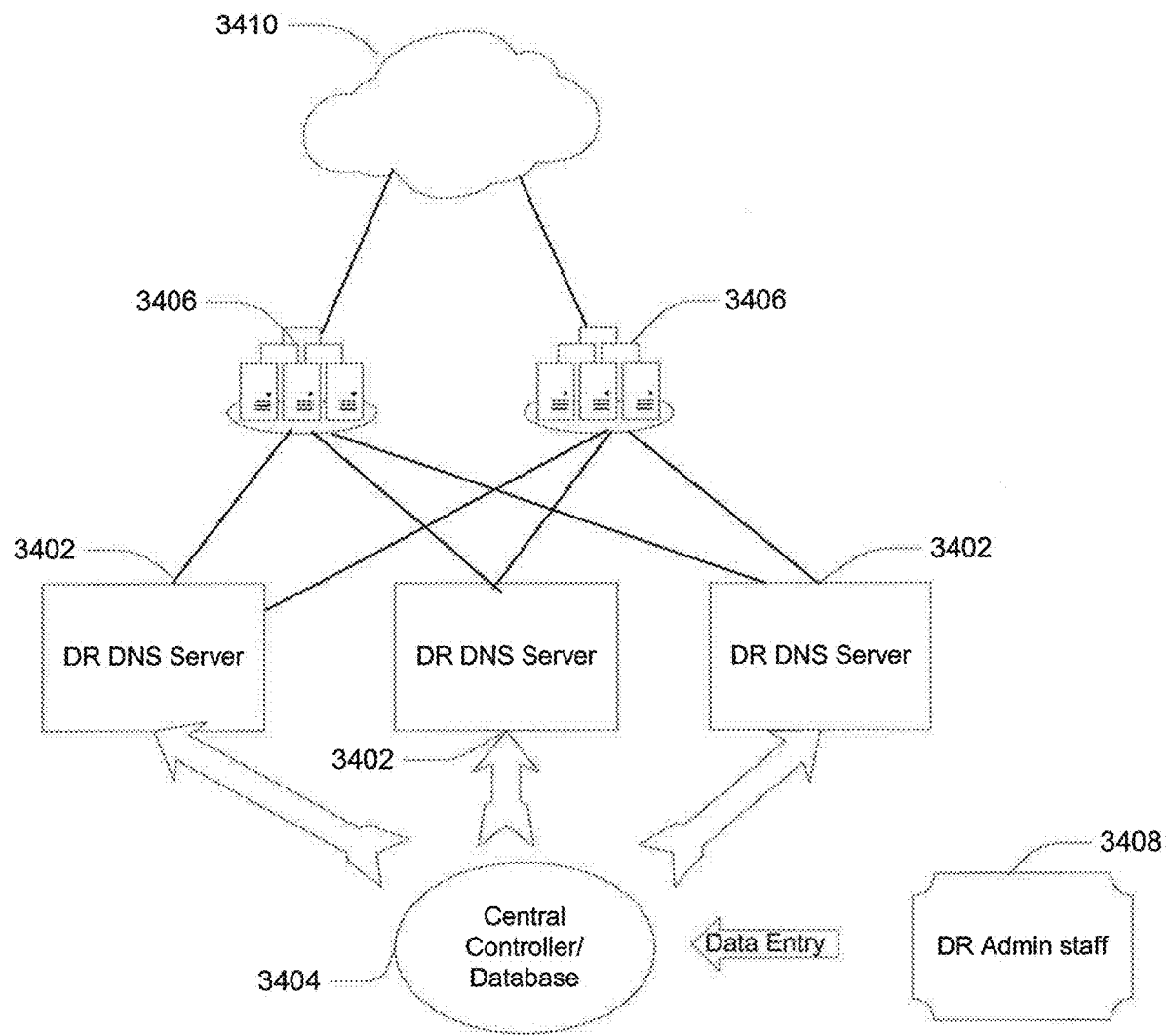
FIG. 34 illustrates a centralized DNS environment.
Figure 35:
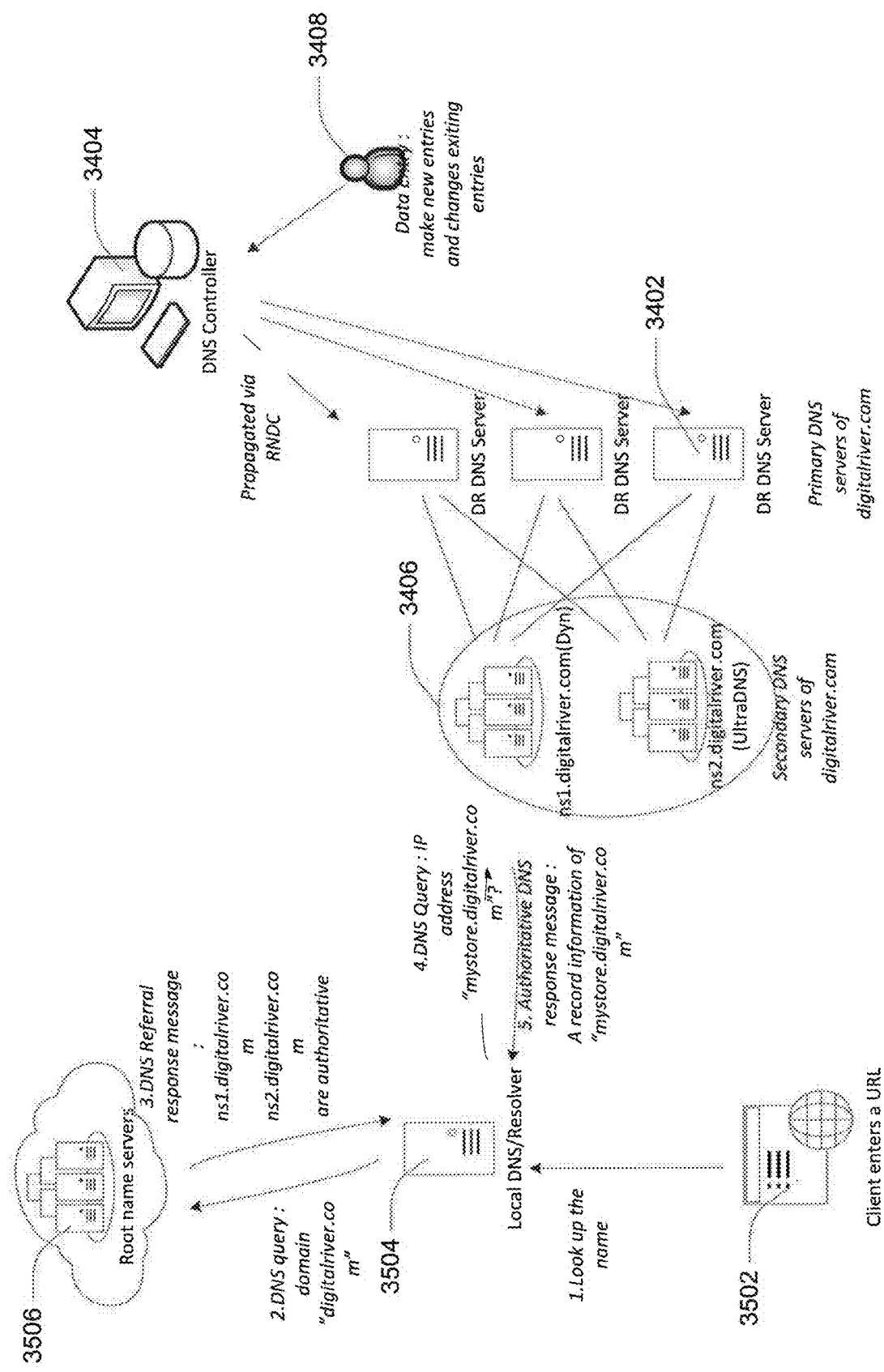
FIG. 35 further illustrates the use of a centralized DNS environment.

FIGS. 11*a* and 11*b* are sequence diagrams illustrating an example of DNS resolution of a global application (FIG. 11*a*) and a service call via ESB (FIG. 11*b*). Further embodiments of high availability DNS features are described below, and are illustrated in FIGS. 34 and 35.

FIG. 8 above illustrated cloudbank load balancers at the cloudbank 808, application 810 and service 816 VLAN. Load balancing may be provided at any level, particularly at the cloudbank and appliance zone levels. Appliance zone load balancers are virtual appliances that perform a load balancing function on behalf of other virtual appliances (typically web servers) running on the same zone subnet.

Figure 12A:
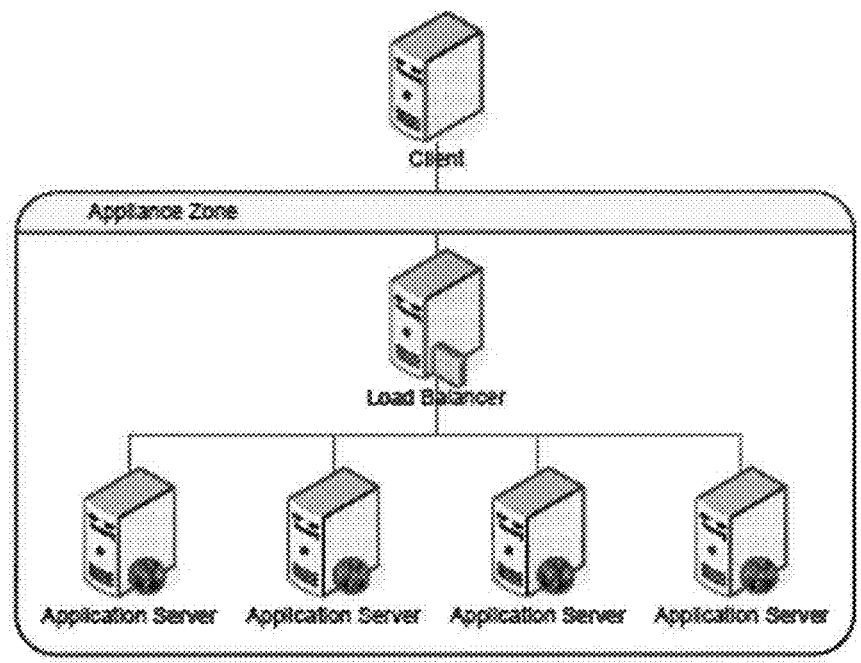
FIG. 12a illustrates a single appliance load balancing model for an appliance zone.
Figure 12B:
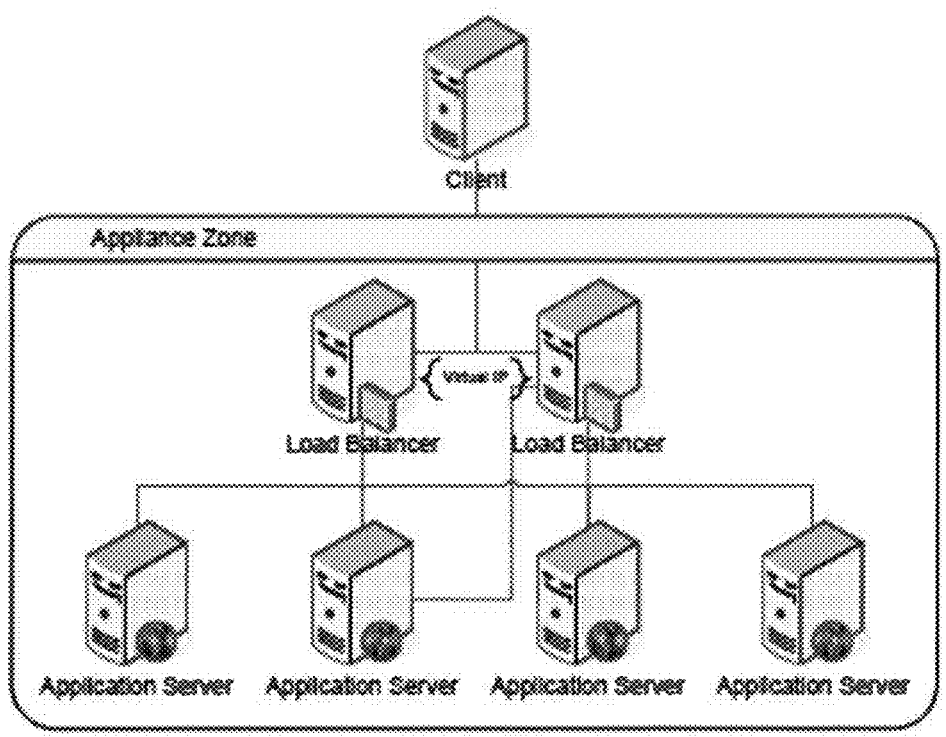
FIG. 12b illustrates a multiple appliance load balancing model for an appliance zone.

The standard load-balancing model for an appliance zone is a single appliance configuration as shown in FIG. 12a. A multiple load-balancing model is shown in FIG. 12b.

Fast Provisioning

In an embodiment of Infrastructure-as-a-Service, users of infrastructure units, such as web servers, databases, etc. may be allowed to rapidly deploy the required hardware and software without intervention from system administrators. This model greatly decreases the time it takes to put a unit into service, and greatly reduces the cost of doing so. In a preferred embodiment, a set of rules governs users' access to a fast provisioning system. Approved users may access the provisioning system with a user name and password.

Provisioning System Technology Stack

Choosing a full technology stack on which to build a provisioning service is not an easy task. The effort may require several iterations using multiple programming languages and technologies. An exemplary technology stack is listed in Table 2 along with notes regarding features that make the technology a good choice for fast provisioning.

TABLE 2

Exemplary Fast Provisioning Technology Stack

| Type | Example Technology | Notes/Features |
| --- | --- | --- |
| API | VSphere API | SOAP API with complex bindings (Java and .NET); vijava |
| Language | Java | The natural choice for interacting with viJava; |
| Language | Python | Interpreted language; large and comprehensive standard library; supports multiple programming paradigms; features full dynamic type system and automatic memory management; java port is "Jython" |
| Framework | Django | Development framework follows model-template-view architectural pattern and emphasizes reusability and "pluggability" of components, rapid development, and the principle of DRY (don't repeat yourself) |
| | Piston - REST API | Piston |
| | Ajax | Dajax is a powerful tool to easily and quickly develop asynchronous presentation logic in web applications using Python. Supports the most popular JS frameworks. Using dajaxice communication core, dajax implements an abstraction layer between the presentation logic managed with JS and the Python business logic. DOM structure modifiable directly from Python |
| | Javascript | Prototype Javascript framework and scriptaculous |
| Database | MySQL | Popular, easy installation and maintenance, free. |
| Web Server | Tomcat 5 | Jython runs on JVM |

Figure 13:
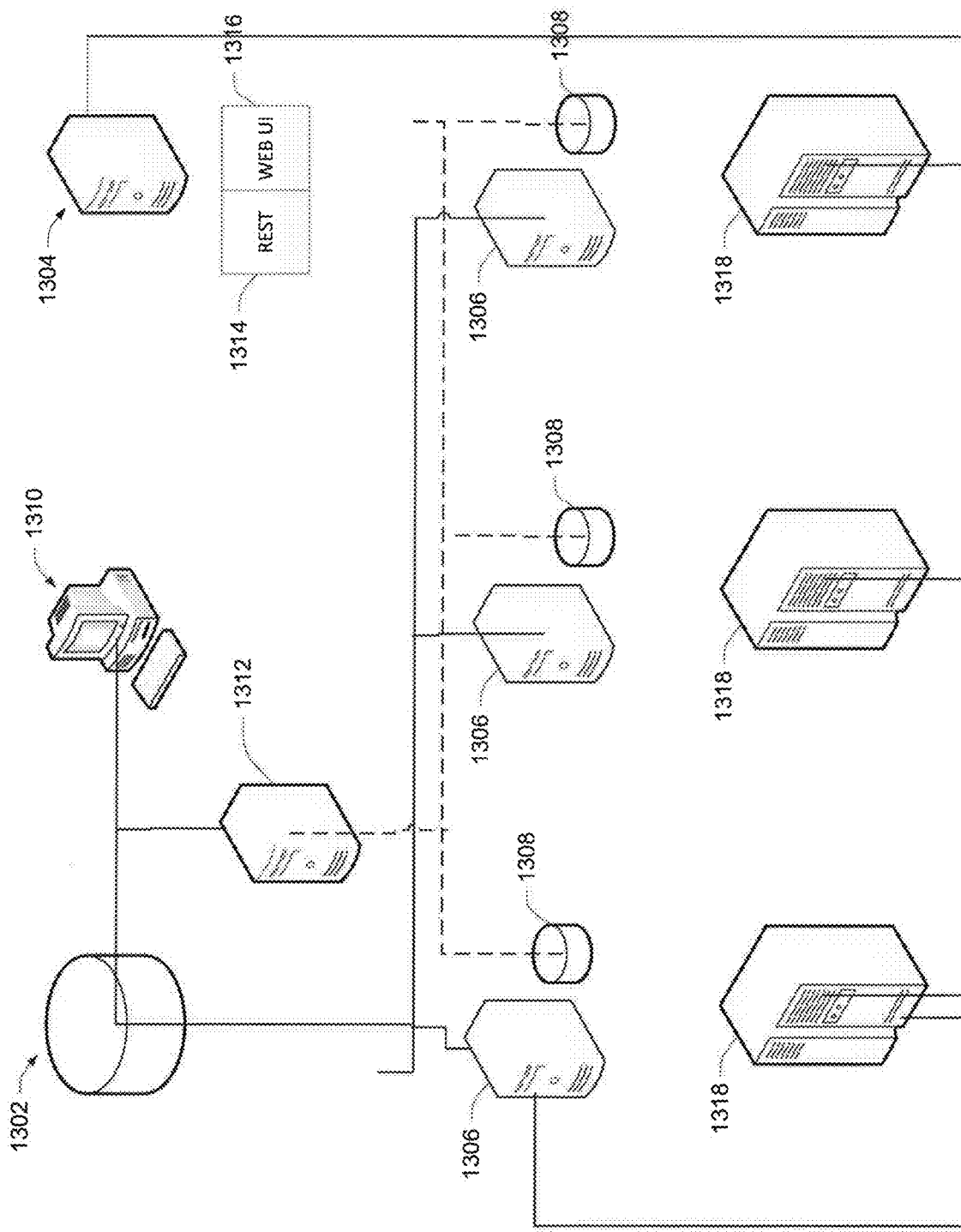
FIG. 13 illustrates an exemplary component architectural diagram for an embodiment of a fast provisioning system.

FIG. 13 illustrates an exemplary component architectural diagram for an embodiment of a fast provisioning system. These components may be distributed across multiple data centers and locations. A GIT repository supporting a fast provisioning system is typically broken out into two separate repositories. One 1302 contains all of the chef recipes, the other contains the code and scripts for the provisioning system itself 1304. The chef repository 1302 refers to a "book of truth" containing all the recipes used to build out and configure systems deployed using the fast provisioning system. Developers use this repository for code check in/checkout. It is a master repository used for merging changes into the branch master and uploading to chef servers 1306 and database 1308. The fast provisioning repository contains all the scripts written to support fast provisioning.

Each virtual data center (which may be comprised of a data center and a virtualization platform client) 1318 has its own chef server 1306. As part of the deploy process, clients (VMs) in each virtual data center 1318 register with the appropriate chef server. A chef server 1306 is further used to perform initial system configuration (package installation, file placement, configuration and repeatable administrative tasks) as well as for code updates and deployment. Access to the chef servers 1306 is typically controlled through a distributed name service and may be limited to engineers. A tool, such as VMWARE™ studio 1310 for example, may be used as the image creation mechanism. It is used for creating and maintaining versioned "gold master" Open Virtualization Format (OVF) images. Further customization of the guests is performed through a set of firstboot scripts, also contained within machine profiles in the studio.

A continuous integration server 1312 is used to distribute the OVF images to repositories in each virtual data center 1318. This server may also be used for a variety of other tasks, including building custom RPM Package Manager (RPM) packages, log management on the data powers and other event triggered tasks. Most importantly, it is used to automate the distribution of chef recipes on repository check-in.

Virtual data center 1318 localized package repositories 1308 contain copies of all of the OVF gold master images, as well as copies of all of the custom built RPM packages. These machines are standard guests with large NFS backed persistent storage back-ends to hold the data. Support for local repositories is installed through a chef script during initial configuration.

For simple data center configurations, a RESTful domain name system (DNS) service 1314 may be used to handle all of the DNS registrations during the machine deployment process. Once a machine name and IP has been assigned by the fast provisioning service, an automated REST call is performed to do the registration.

The provisioning service communicates with each virtual data center server via a soap XML interface and communicates with Chef Servers via a REST interface 1314. The provisioning service provides a simple RESTful interface and Web UI for internal provisioning.

The Fast Provisioning System integrates various underlying technologies and offers additional benefits, such as: Integration with DNS registration, as discussed below; storage allocations; integration with OPScode Chef and orchestration mechanisms for automated configuration and deployment of services; stores VM creation details for rapid deployment in the event of loss; provides finer privilege control; can arbitrate the access and view to a specific user; integration with other disparate systems, such as storage, monitoring and asset management; provides a simple REST interface for integration of the provisioning system into other tools and software; automatically uploads the appropriate OS image to the system during deployment with no extra steps.

Figure 14:
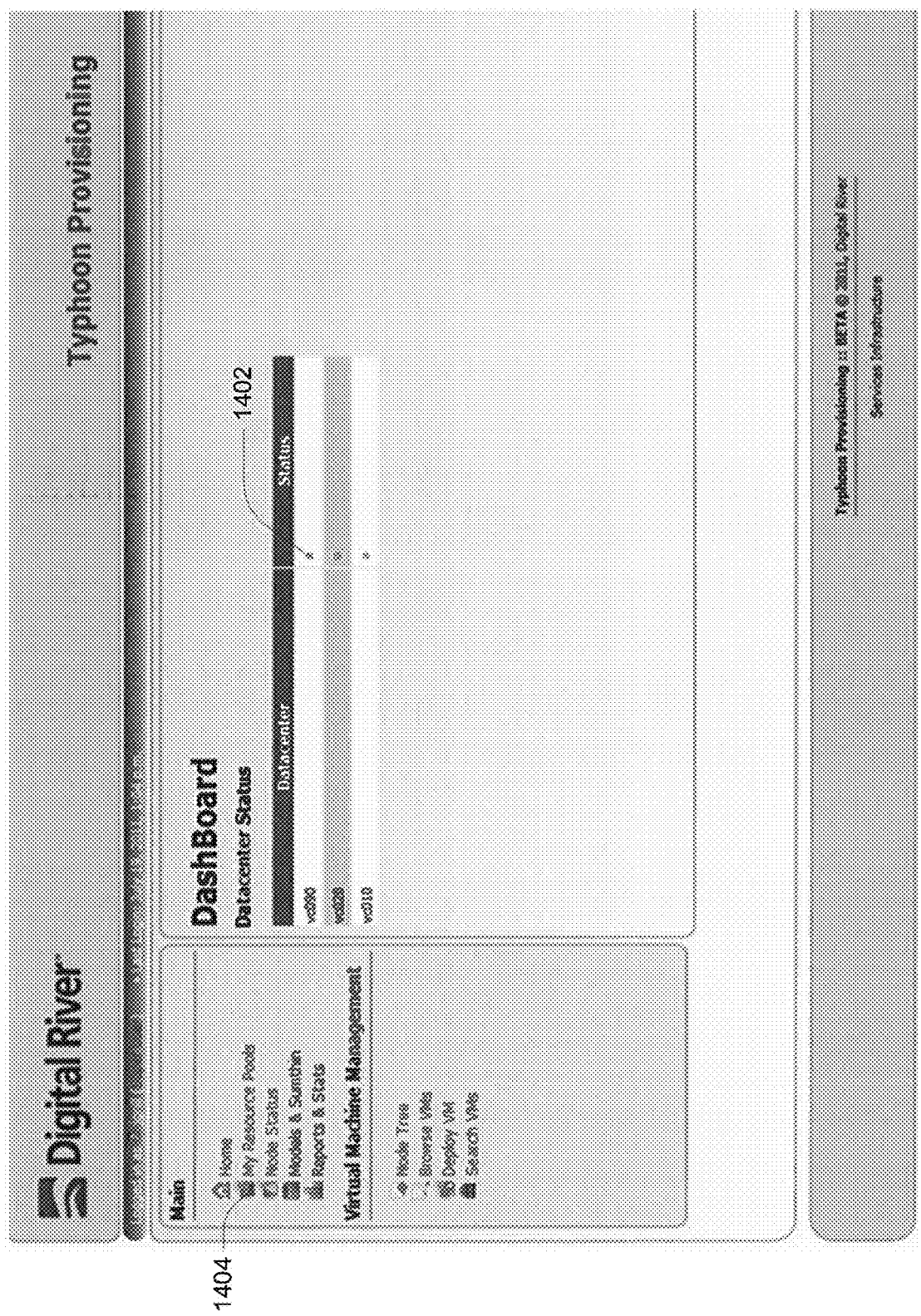
FIG. 14 illustrates a Dashboard showing datacenter status for all of the data centers for which a user has access.
Figure 15:
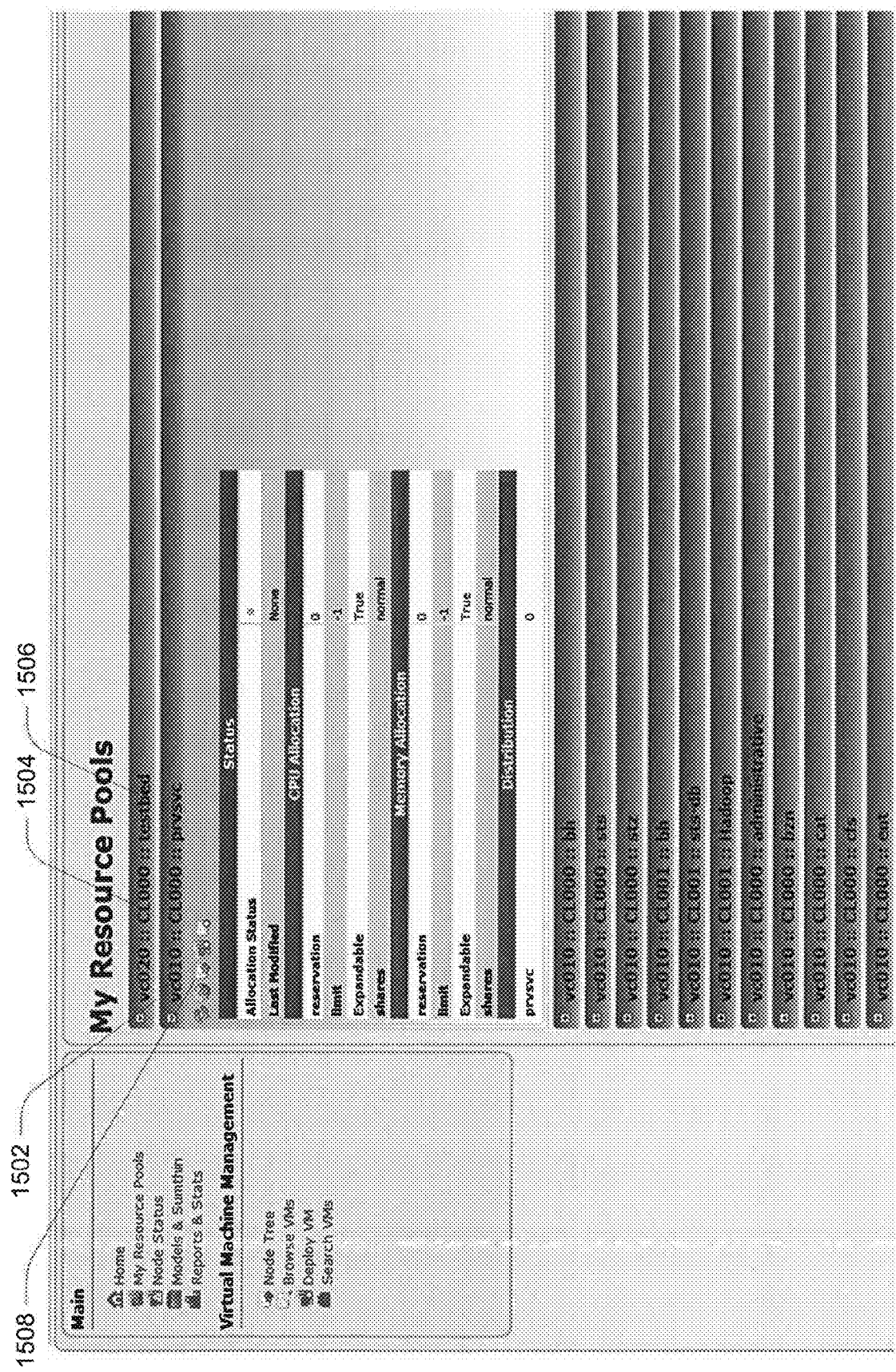
FIG. 15 is a screen shot of a "My Resource Pools" screen.

A preferred embodiment of a fast provisioning system and method includes a user interface and a number of modules, each module stored on computer-readable media and containing program code which when executed cause the system to perform the steps necessary to perform functions toward creating the virtual environment. The code modules may be integrated with various tools and systems for the creation and management of virtual resources. A graphical user interface (GUI) steps the user through the process of creating virtual resources. A preferred embodiment of a provisioning service is accessed with a user name and password provided to approved users. FIGS. 14-30 illustrate the provisioning process using a Fast Provisioning system and method. FIG. 14 illustrates a home screen that may include a dashboard showing datacenter status for all of the data centers for which the user has access. A status light 1402 may use an indicator color to convey the datacenter status to the user. Selecting "My Resource Pools" 1404 under the Main menu redirects the user to the My Resource Pools screen (FIG. 15), which allows the user to view status, CPU allocation, memory allocation and distribution details for each of the user's resources (i.e. server systems). The user presented with the resource pools in FIG. 15 has a number of resources 1506 in virtual centers vc020 and vc010 1502, on cloudlets CL000 and CL001 1504. Selecting the vc010::CL000::prvsvc resource provides the details for that resource. Icons below the resource name 1508 provide utilities that allow the user to refresh the cache to view changes in the display, view settings and resource pool details, and perform virtual machine management functions such as create and deploy new resources. An advantage of deploying a resource from this screen is that the resource will be deployed to the specific resource pool selected.

Figure 16:
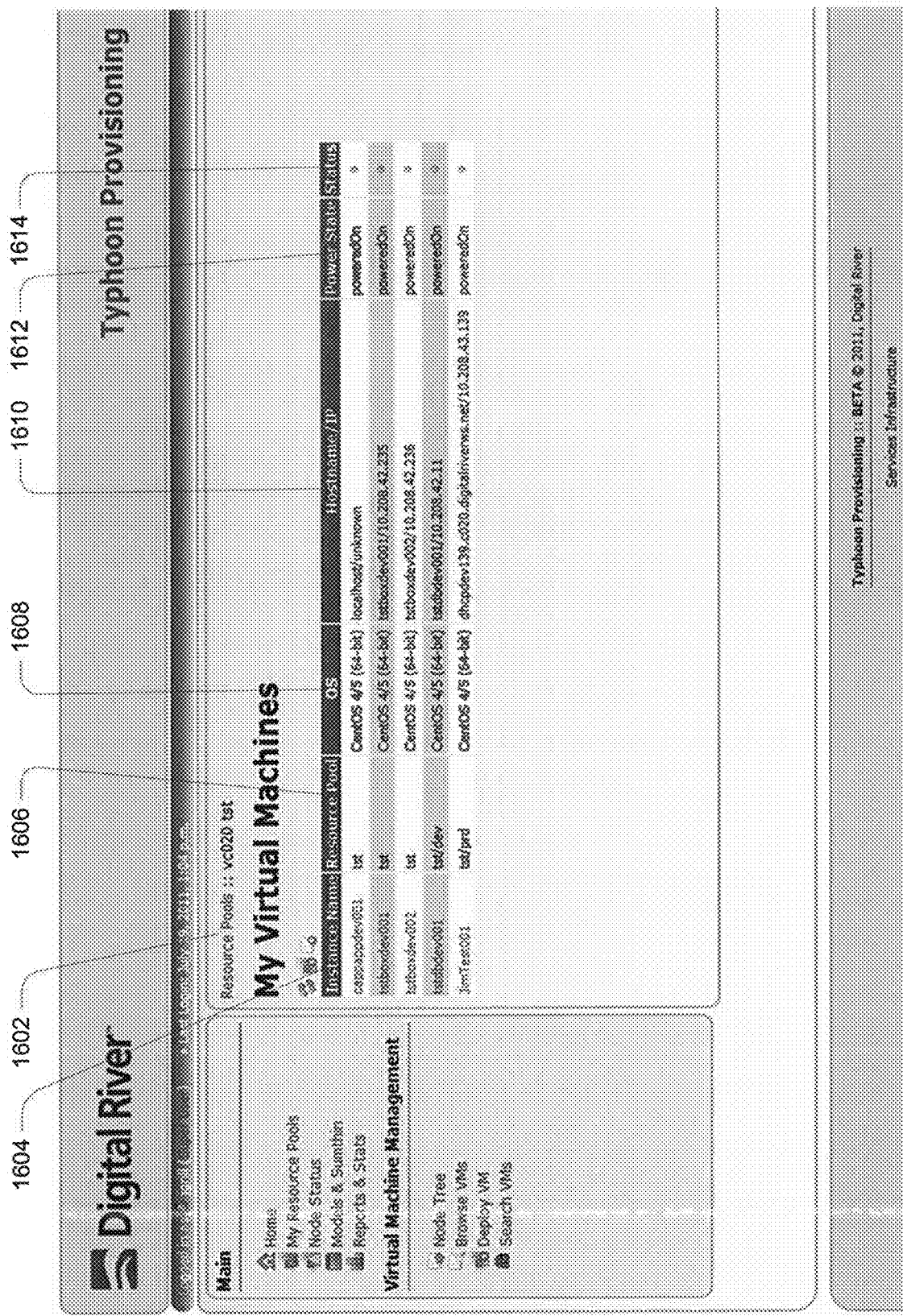
FIG. 16 illustrates resource pool and the virtual machines assigned to the user.
Figure 17:
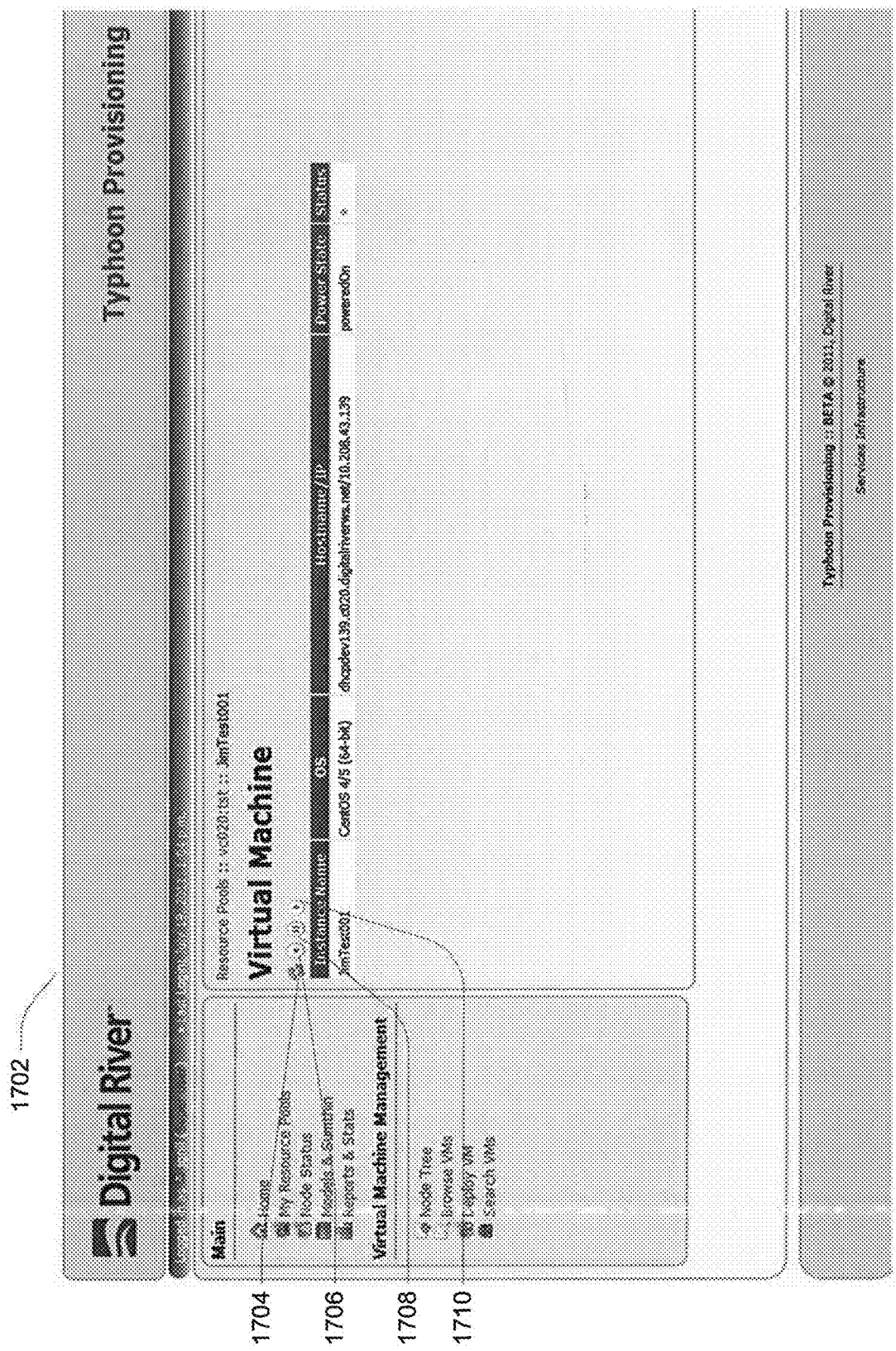
FIG. 17 is a screen shot of a virtual machine information screen.
Figure 18:
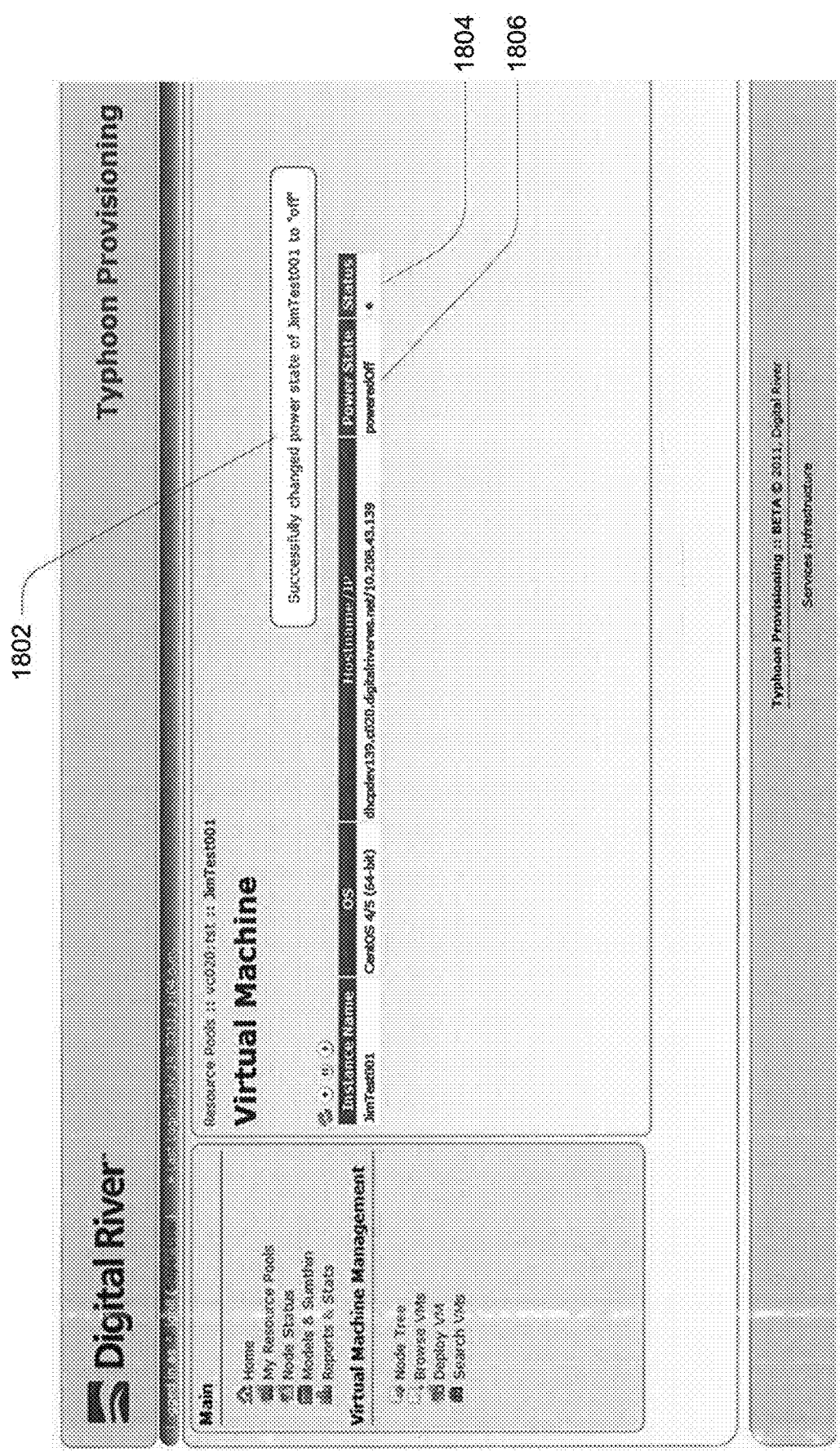
FIG. 18 is a view of the resources in node-tree form.
Figure 19:
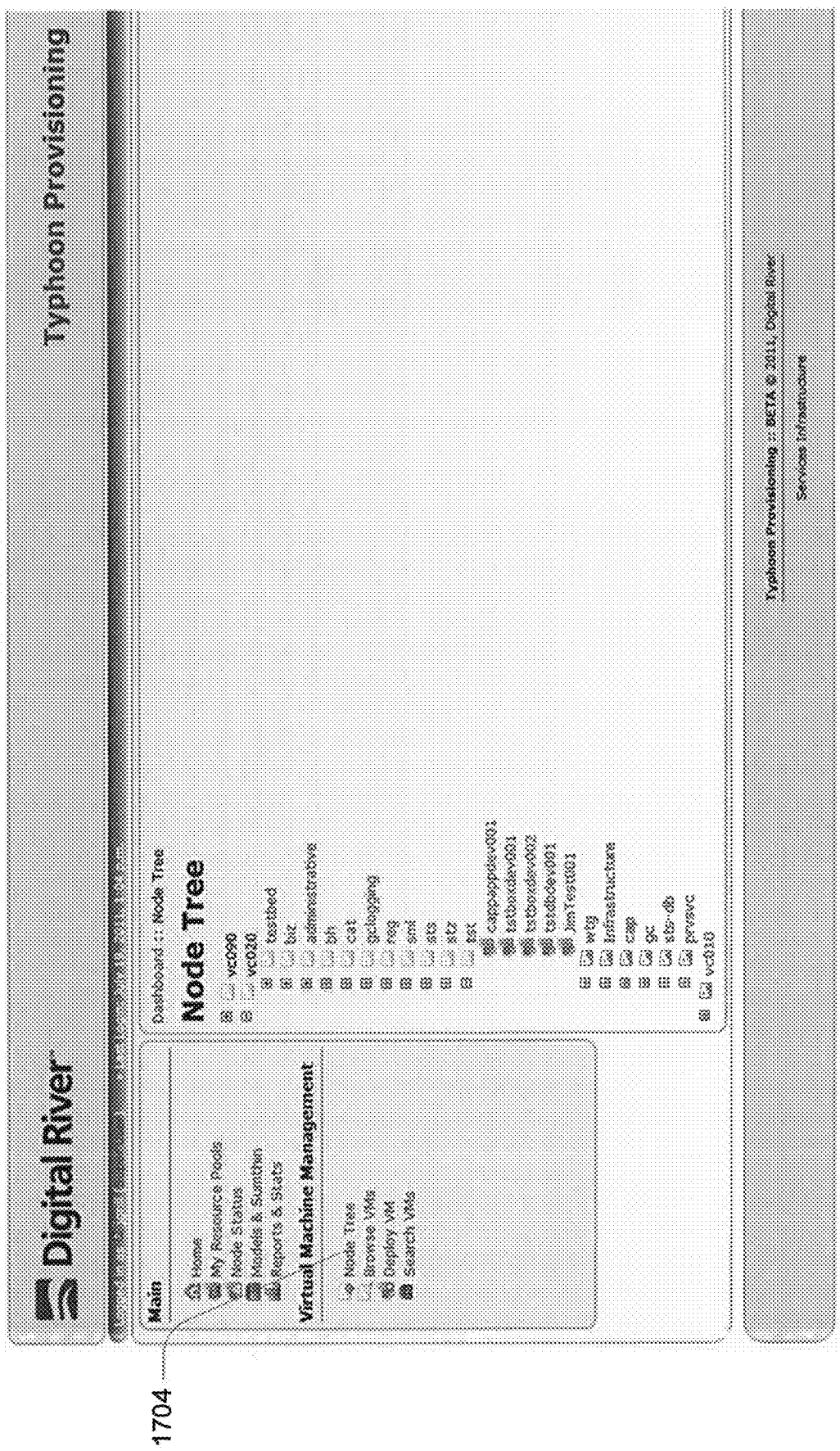
FIG. 19 is a screen shot of a "Deploy Virtual machine" window used to select the resource pool for the resource to be deployed.
Figure 20:
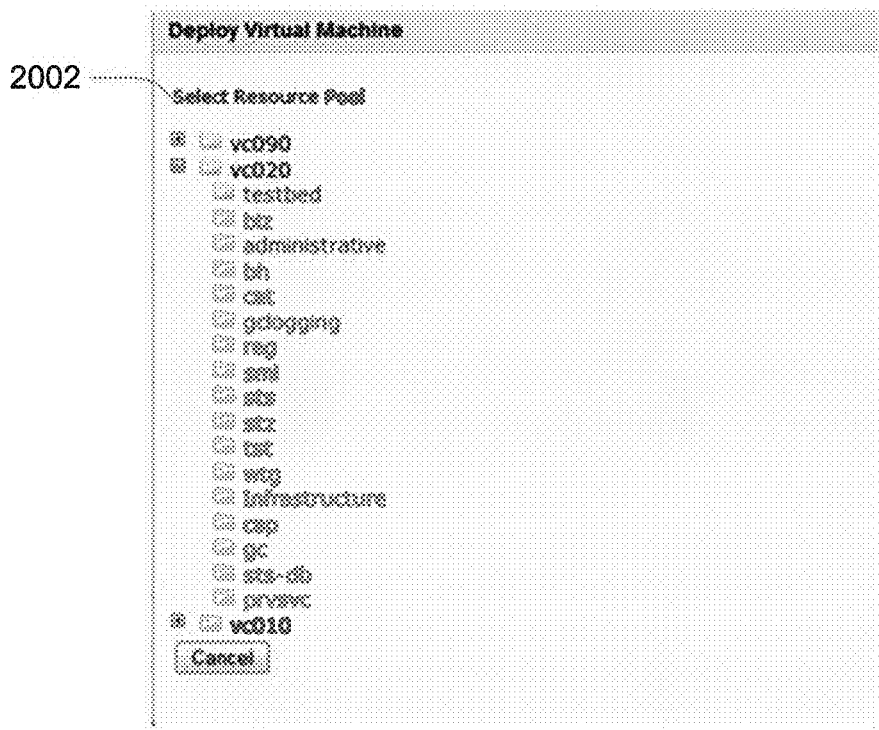
FIG. 20 is a screen shot of a "My Virtual Machine" screen.

Referring now to FIG. 16, Drilling down on the resource pools 1602 in the virtual center allows the user to view all Virtual Machines assigned to the user, including the instance name 1604, resource pool 1606, operating system information 1608, hostname/IP address 1610, power state 1612 and status 1614. Selecting a particular virtual machine generates a screen specific to the selected virtual machine (FIG. 17 1702) and includes icons that allow the user to refresh the view 1704, power down 1706, suspend 1708, or power up 1710 the particular instance. When the user attempts to change the power state of the resource, the user is notified (FIG. 18) with a success or failure message 1802. The power state 1804 and status 1806 values change accordingly. The user may also view resources by selecting the node tree from the Virtual Machine Management menu on the left side of the screen (FIG. 18), and drill down to the virtual resource details from this screen.

By selecting "Deploy VM" from the Virtual Machine Management menu, the user may deploy a resource into a particular pool. A "Deploy Virtual Machine" popup window (FIG. 19) allows the user to select the resource pool. This window may overlay the node tree view of FIG. 18. Selecting a pool may generate the "My Virtual Machines" screen (FIG. 20) from which the user may select a "deploy" icon 2002 to indicate from which resource pool to deploy. Various popup windows may offer options to the user.

Figure 21:
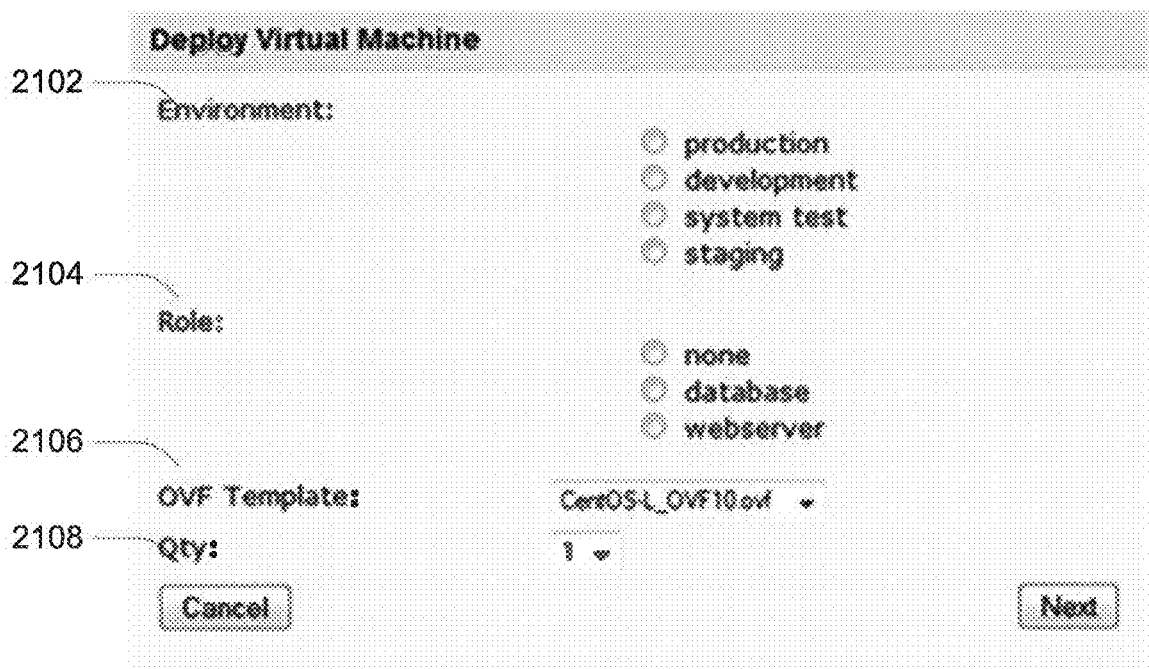
FIG. 21 is a screen shot of a window providing options for selecting environment and role of the new resource.

Referring now to FIG. 21, the user is initially asked to select an environment and role for the new resource. A deployment life cycle may consist of a series of deployments for QA purposes, such as deploying to development, then test, then staging, and finally to production, depending on the requirements of the user. Any such life cycle may be accommodated by allowing the user to select the environment 2102 to which the resource will deploy. A machine role is also selected 2104. The role indicates the type of resource that is being deployed, such as database or web server. Roles allow the system to provide standard code files, or recipes, for configuring a particular type of server. The role selected will determine the options that are subsequently presented to the user. Choosing "no role" means the user must select from a variety of options for all components, rather than taking advantage of the prepackaged configurations. The user selects the OVF template for installation 2106, and the quantity of such resources required 2108.

Figure 22:
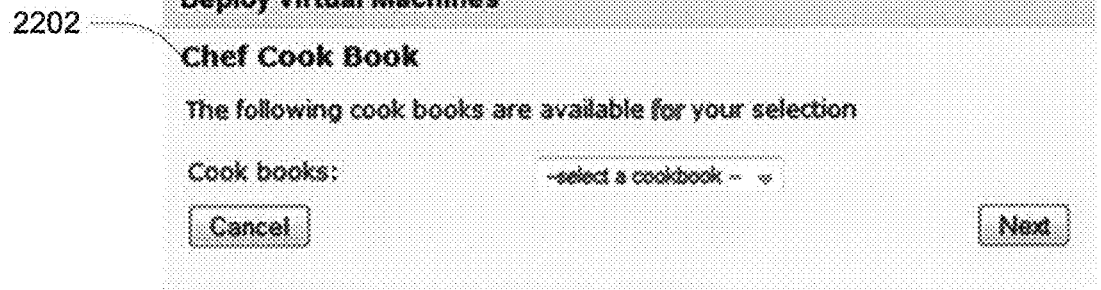
FIG. 22 is a screen shot of a window providing the user with available chef cook book selections.

Next, the user selects a Chef Cook Book 2202 from the options available for the designated role (FIG. 22). The terms "chef," "cook book" and "recipes" are used here to describe the roles, repositories and instructions, respectively, for creating the required resources. This terms are meant to be merely descriptive and not limiting in any way. As was discussed above, cook books hold "recipes" for creating the virtual machine. They consist of code modules that configure the system to company standards and requirements. The cook book may contain code for any type of desired feature. An exemplary cook book may be a "mysql" cook book which is offered as an option when a database role is selected along with others.

Figure 23:
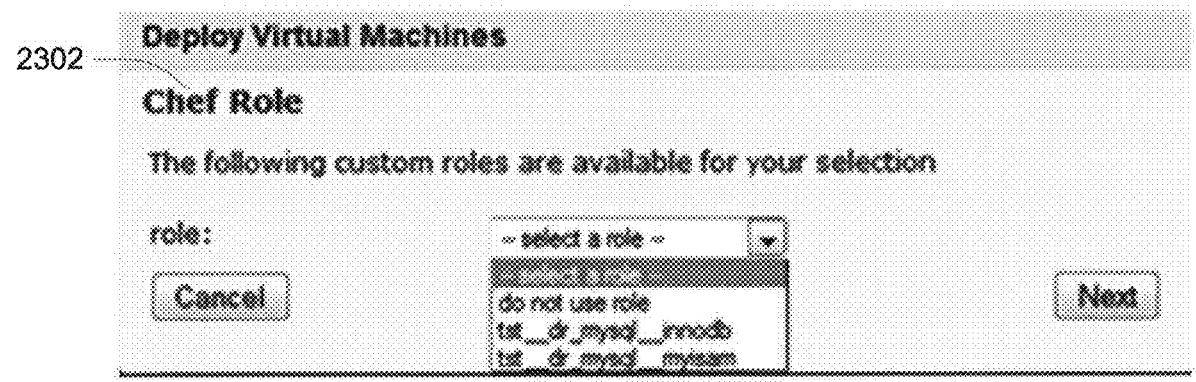
FIG. 23 is a screen shot of a window providing the user with available chef role selections.
Figure 24:
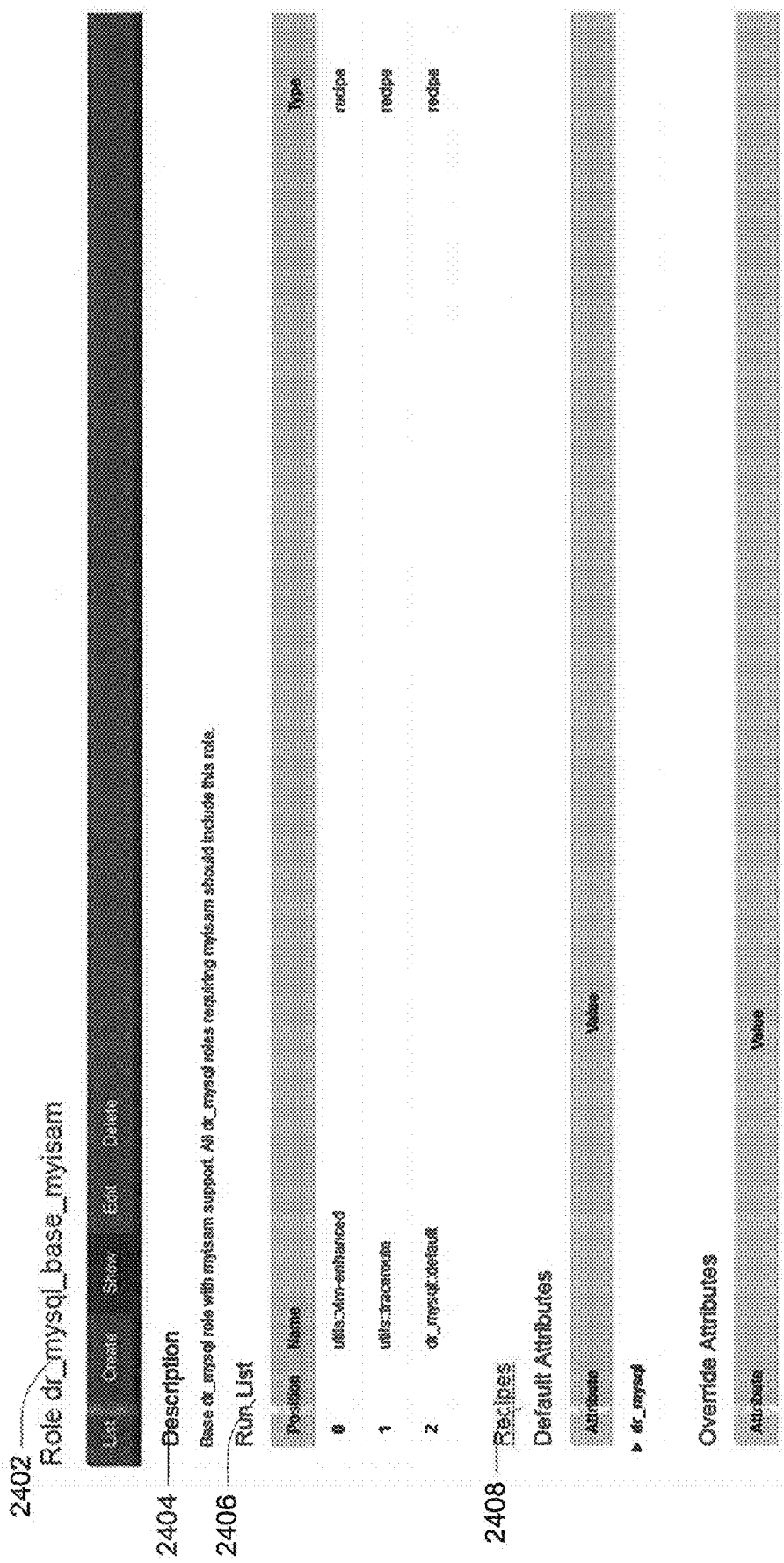
FIG. 24 is a screen sot of recipes associated with an exemplary role.
Figure 25:
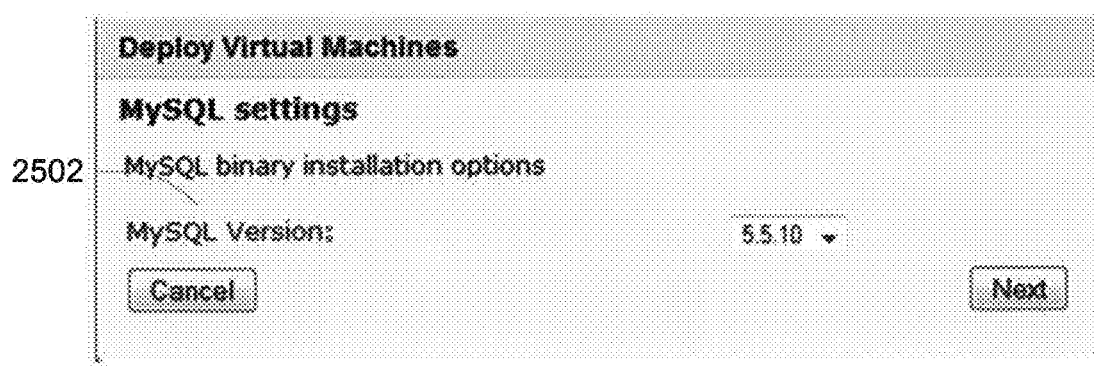
FIG. 25 is a screen shot of software version options supported by the company's fast provisioning system.
Figure 26:
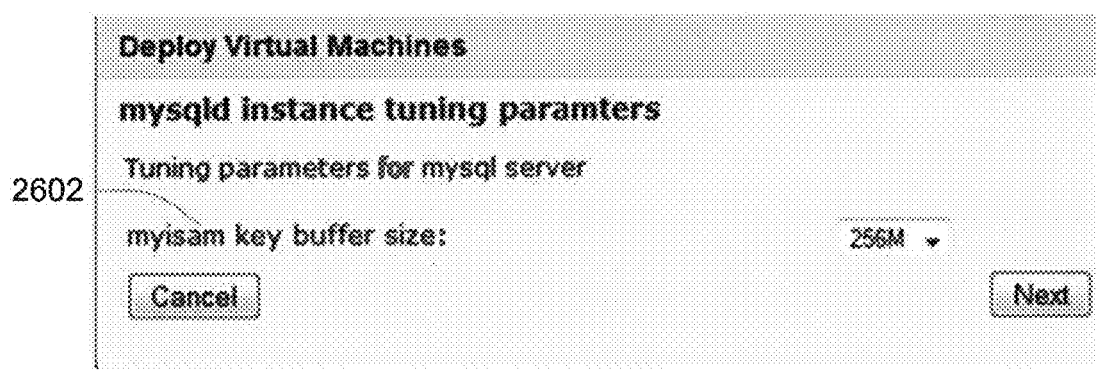
FIG. 26 is a screen shot of tuning options offered to a user.
Figure 27:
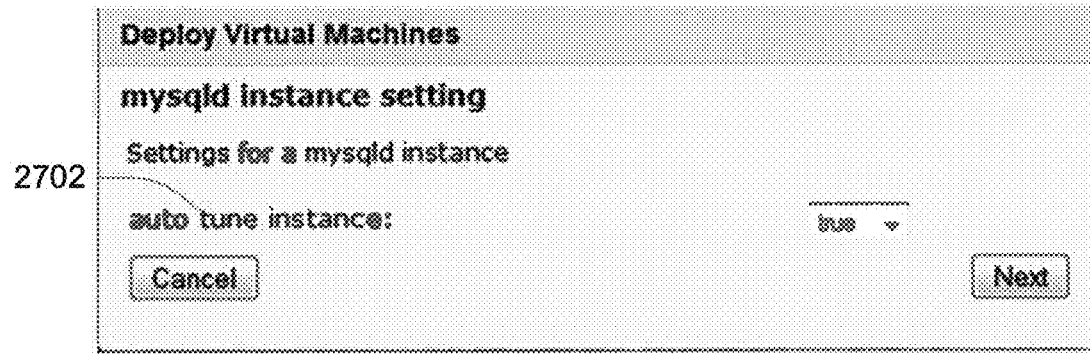
FIG. 27 is a screen shot of tuning parameters offered to a user.

Next, as is illustrated in FIG. 23, the user chooses a Chef Role 2302 from those available for the selected resource. As with roles discussed above, each role further identifies the code and features that go into configuring a specific resource, and drive the options that are subsequently presented to the user. FIG. 24 is a screen shot of the recipes associated with an exemplary role. Such a screen in a preferred embodiment of a role 2402 provides a description of the recipes 2404 included in the role along with a run list 2406, and default or other required attributes 2408. In FIGS. 25, 26 and 27, the user is presented with options for settings used to deploy virtual machines, such as which of the company's supported version of the software 2502 is desired (FIG. 25), application tuning requirements 2602 (FIG. 26) and, if so, options for tuning parameters 2702 (FIG. 27).

Figure 28:
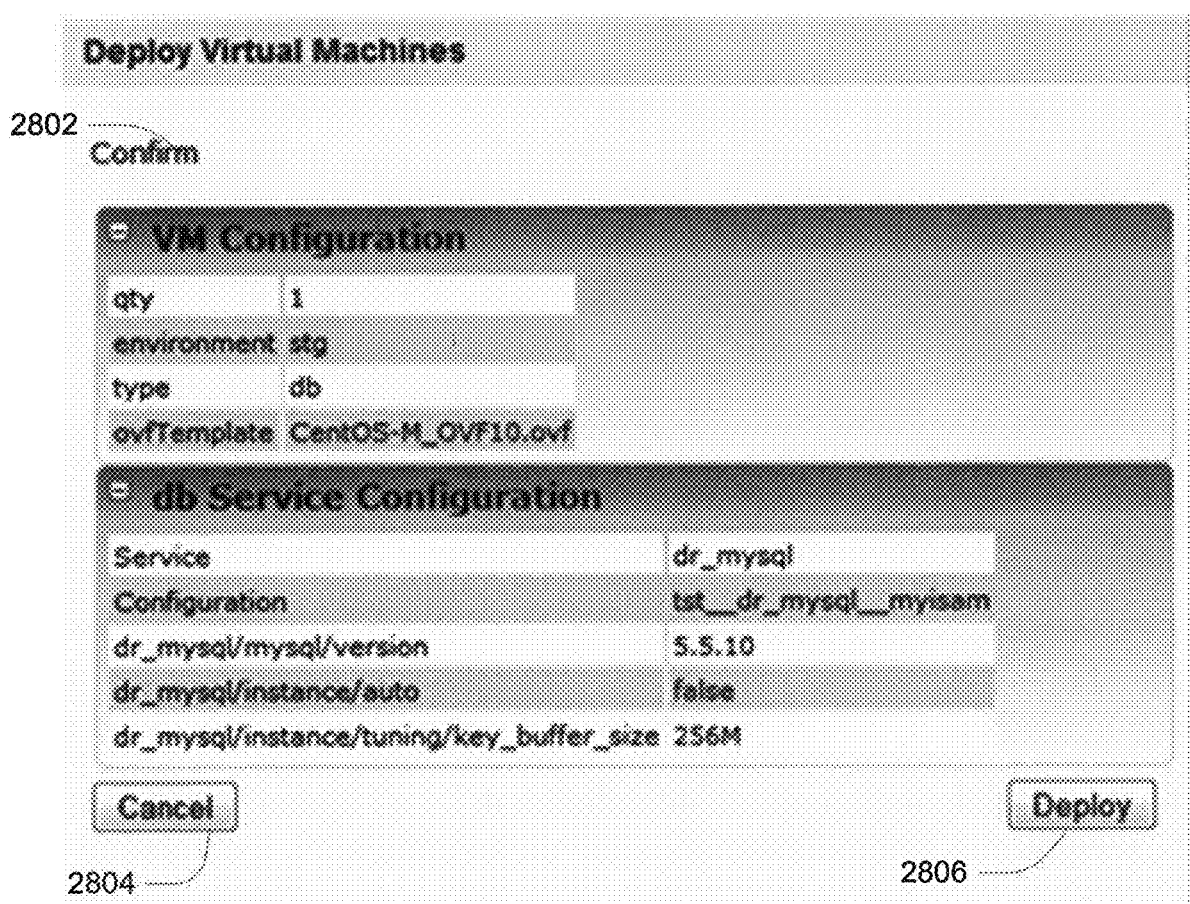
FIG. 28 is a screen shot of resource selection parameter confirmation popup window.
Figure 29:
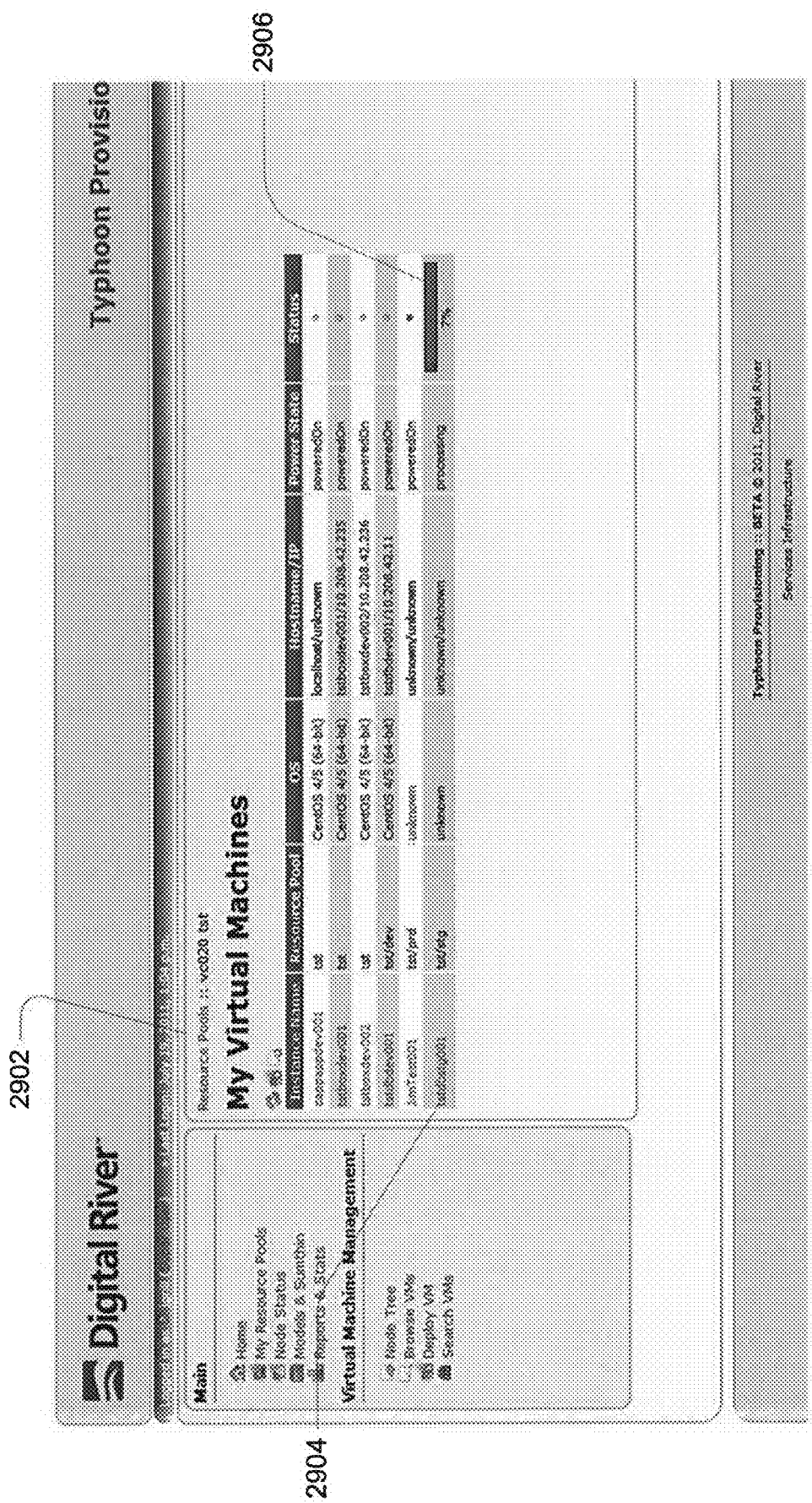
FIG. 29 is a screen shot of the "My Virtual Machines" screen during deployment of a new resource.

When all of the options and features for a resource role have been selected, the user may be presented with a confirmation popup window 2802, as shown in FIG. 28. All of the selected parameters and values are presented to the user so that they may be confirmed before deploying the instance. The user may cancel the configuration 2804 or deploy the virtual machine as configured 2806. When the user clicks the "Deploy" button 2806, a screen may be displayed 2902 showing all of the virtual machines associated with the user (FIG. 29). The deploying instance 2904 is included on the list of resources, along with a processing status bar 2906. A status message is presented to the user when deployment has completed or has been aborted for some reason.

Figure 30:
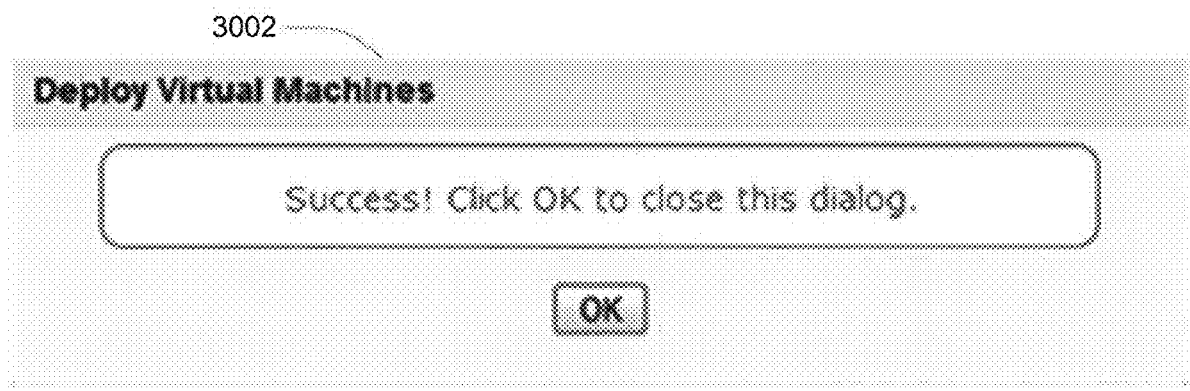
FIG. 30 is a confirmation message provided when the resource has been successfully deployed.

Back-end processing includes assigning an IP address and host name, and registering these identifiers with the DNS; creating the virtual space for the server and installing the requested software. The user is presented with a confirmation that the resource creation process is completed and fully deployed (FIG. 30).

An additional step may be required depending on the type of applications selected. There exists a classification of machines that expect their storage to be co-resident with the physical host on which they run. For example, classic "Big Data" applications (Kafka, Cassandra, etc.) use mechanisms within the application to replicate and spread data amongst cluster members. As such, utilizing a traditional shared storage back-end to host the virtual machine disks is unnecessary and expensive. Furthermore, many of these have awareness of "rack location" which enables them to ensure that data is replicated in an optimal manner to ensure that individual failures (host and/or rack) does not impact data availability. When using a shared storage environment, the application needlessly replicates its data amongst machines that all reside on the same storage, creating a single point of failure. An option is required to target a specific host and its local data stores that aren't present to the entire cluster.

A workflow or program module may be created and implemented using an automated workflow system. The workflow may be called during the machine provisioned step (FIG. 30). Based on custom properties specified on the VM request, the workflow finds the virtual machine, moves it to a designated host and moves storage to the appropriate data stores. The workflow expects the following inputs allowing for greater flexibility in placement decisions and guest architectures in an effort to make it suitable for the larges possible set of consumers:

TABLE 3

Local Storage Deployment Input Properties

| Input | Description | Default |
|---|---|---|
| Consumer | Specifies the hostTag attribute to use when finding suitable hosts with local storage | MUST be populated |
| Allow co-location on host | Specifies whether you want to share the host with other local storage virtual machines | Default value is false |
| Span data stores | Specifies whether you want to keep all the VM disks and VM executables together on the same data store or spread the VM disks across data stores | Default value is false |
| OS Disk Count | Specifies the number of disks to collocate on each data store specified by DigitalRiver.Infrastructure.DASConsumption.OS DatastoreCount (starting with datastore0) | Default value is 1 |
| OS Data Store Count | Specifies the number of data stores on which to collocate the number of disks specified by DigitalRiver.Infrastructure.DASConsumption.OS DiskCount. | Default value is 1 |

Figure 31:
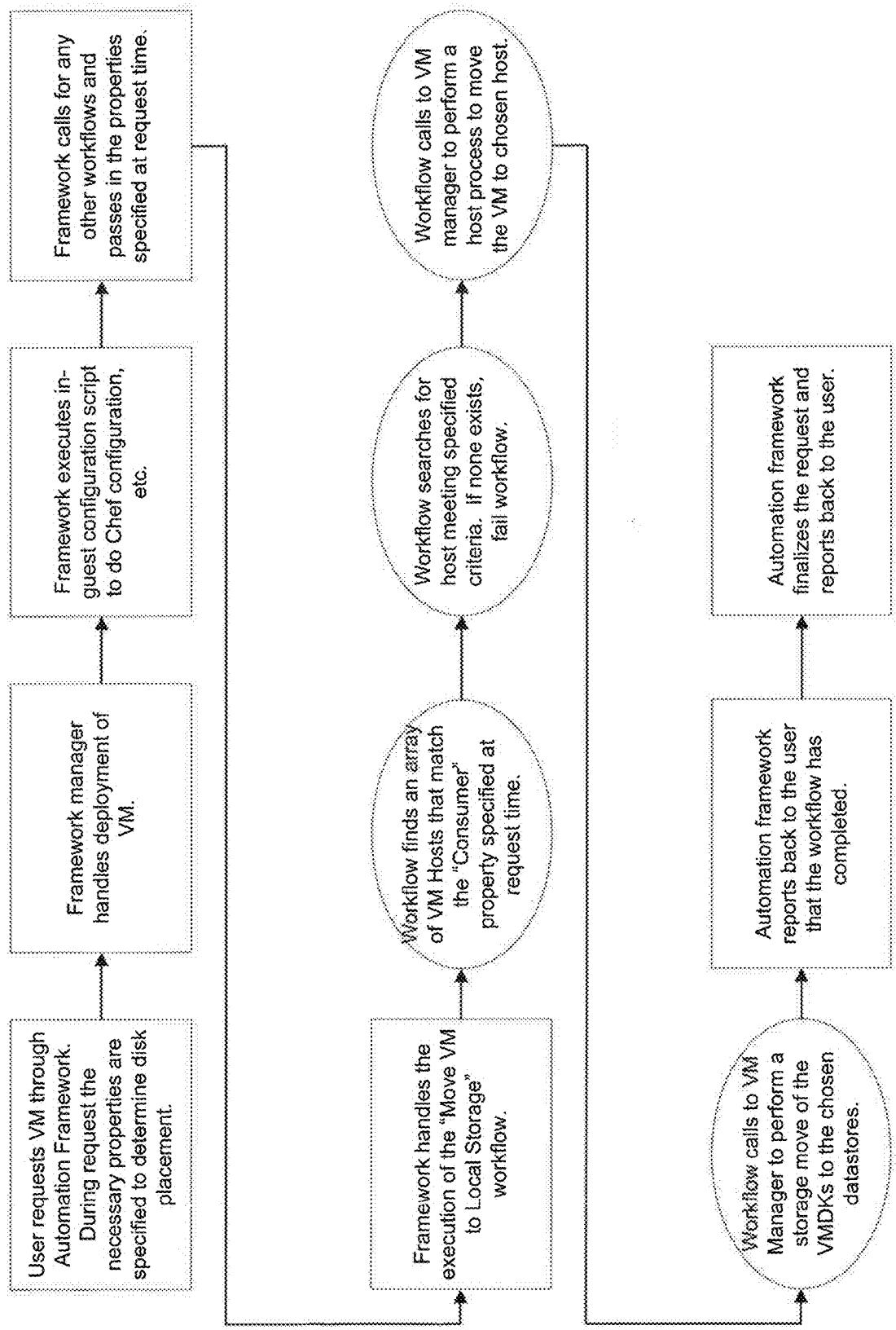
FIG. 31 illustrates an exemplary workflow for creating a local storage environment.

FIG. 31 illustrates the process of directing the automation system to create local storage. When requesting the VM through the automation framework manager, the system requests, and the user defines, the properties necessary for determining disk placement 3102. The framework manager handles deployment of the VM 3104 and executes the configuration script to configure the machine based on the selected roles or features 3106. When the machine has been configured according to the requested specifications the framework manager calls for any other workflows and passes in the properties that were specified at request time 3108. The framework manager handles the execution of the move to local storage as requested 3110. The workflow is programmed to find an array of VM hosts that match the properties (i.e. "Consumer" in this case) specified at the time of the request 3112, and loops through the chosen hosts looking for one that meets the specified criteria 3114. If no such host is found, the workflow fails. If found, the workflow calls to a VM manager to process a move of the VM to the chosen host 3116. The workflow then calls the VM manager to perform a storage move of the VMDKs to the chosen data stores 3118. When complete, the automation framework reports back to the user that the workflow has been completed 3120, and finalizes the request 3122.

FIG. 32 illustrates the properties 3202 that are used to control VM storage disk placement, and an exemplary set of values 3204. The result is data storage locations as requested. FIG. 33 is a screen shot of the local storage configuration.

Many issues challenge the maintenance of a highly available cloud environment. For example, failure of a DNS system to provide a response to a DNS request can result in a system that is unusable to clients. One common issue is the Distributed Denial of Service (DDoS) attack. DDoS attacks attempt to flood a server or system with so many packets of data that it becomes difficult or impossible to reach for legitimate traffic. It doesn't necessarily stop the server form working, but the overload of data results in the system being all but unusable. If a DNS server is attacked by DDoS, user requests for all websites in its directory may be denied. DDoS attacks have become relatively commonplace in internet communications. Other issues may impact high availability as well.

As a solution to the issues that threaten availability, and to ensure high availability in general, an organization may implement centralized control of its DNS infrastructure. A centralized DNS system and method may migrate all DNS zones in the cloud environment. FIG. 34 illustrates a cloud platform's centralized DNS system, including servers 3402, control system 3404 and external authorities 3406. In a centralized DNS system, internal servers may host DNS data, possibly using a software product such as the open source product Bind. Internal servers may be the source of truth with regard to the organization's DNS information. A controller 3404 may provide a common interface for all DNS administration, maintenance, access, designation of a server's purpose and workflow, zone maintenance and more. The controller 3404 generally comprises a user interface allowing administrators 3408 to enter data for a page site or location, designate which servers are internal and which are external and provide access to those servers, allow the administrator to split zones between different providers for reliability, apply a single security scheme for the entire DNS process redundant DNS internal servers and externally-exposed DNS servers. Administrators 3408 may create entries in the controller to be managed across corporate-wide DNS servers 3402. Externally exposed servers may be queried by external DNS authorities 3406, such as Dyn and UltraDNS. The external authorities 3406 may be configured as secondary servers, and programmed to query internal servers, copy the zones and check for updates on a periodic basis (e.g. once every 10 minutes.) External authorities 3406 interface with an extensive network of root servers to direct internet users to their requested web domains and pages. Such a centralized system allows an organization to maintain redundant services with the same data, keep original data in house, and have an easily usable common point of control over all of the DNS enterprise. This configuration provides a single powerful interface, a single security scheme, allows access to all zones from a single point, but provides the ability to split zones between different providers for reliability and greatly reduces trouble shooting efforts.

FIG. 35 further illustrates information flow through a centralized DNS environment. An organization may have a number of zones, name spaces allocated for a particular server, with instructions for resolving specified internet domain names to the appropriate IP address. A large number of zones may be spread across a number of servers 3402 in different data centers. A centralized controller 3404 keeps records consistent by use of protocols such as AXFR (a mechanism for replicating DNS data across DNS servers) and SSH (secure shell protocol for accessing remote severs). External providers 3406 may obtain local DNS records by push or pull technologies. Firewalls in each of the datacenters may be opened to accept TCP port 53 (zone transfers) traffic from the external providers to the BIND servers. The local DNS servers 3402 may contain scripts that programmatically use the external providers' REST APIs to create secondary zones corresponding to the organizations externally resolvable zones. The external providers may pull all zone information from the organization's BIND servers. Zone header information may be set to enforce the following parameters for zone replication: (i) refresh of zone information set to a time period, such as 15 minutes—any changes may be picked up by the external providers in 15 minutes or less; (ii) an SOA TTL (Time to Live) is set to 24 hours (if a DNS record is changed on the authoritative name server, the DNS servers around the world can still be showing the old value from their cache for up to 24 hours after the change); and (iii) the expire may be set to one month. This configuration can ensure that the organization's zone information will live in the external provider's secondary zones for up to one month if all the organization's own servers go down.

Using domain registrar portals, the organization assigns authority for each top level domain to an equal number of resolvers from each external provider. DNS administrators use the controller 3404 desktop application to make new entries or change existing entries, for instance adding mystore.organization.com. New changes are registered with the controller's central database and are propagated to the BIND servers via RNDC (Remote Name Daemon Control). In 15 minutes or less, the resolvers from the external providers pick up the new zone changes and transfer the information via AXFR.

Referring again to FIG. 35, an organization's customer client 3502 may enter a URL, such as mystore.organization.com in their web browser. The web browser looks up the name by sending a DNS request to their local DNS (LDNS). The LDNS resolver 3504 sends a query message to the recursive resolver asking for the address of mystore.organization.com. The DNS recursor sends a query message to the root name servers looking for the .com domain name space. The root name servers send a DNS referral response message to the DNS recursor informing it to ask the generic top level domain (gTLD) name servers for the .com domain name space. The DNS recursor sends a query message to the gTLD name servers looking for the .organization.com domain name space. The gTLD name servers send a DNS referral response message to the DNS recursor informing it to ask the .organization.com name servers, ns1.organization.com or ns2.organization.com, about this domain name space. The DNS recursor sends a query to ns1.organization.com or ns2.organization.com asking for mystore.organization.com. The .organization.com name servers, ns1.organization.com or ns2.organization.com send an authoritative DNS query response message to the DNS recursor with the A (address) RR information for mystore.organization.com. The DNS recursor sends a DNS query response message to the DNS resolver with the A (address) RR information for mystore.organization.com. If the name servers (for instance, ns1.organization.com) at one of the external providers are not responding because of technical difficulties or a DDoS attack, the DNS queries are routed to the name servers of the other provider (ns2.organization.com), giving the organization added protection.

Such a centralized DNS environment as described above presents several options for using DNS providers. For example, an organization could use two providers 3406, all records may be maintained on both sites, but one is on standby while the other operates continually unless a problem occurs in the primary provider system. Alternatively, zones could be distributed between providers 3406, effectively distributing the risk between the two locations. An additional alternative would be to use two providers 3406 with pointers to both that would alternate service for service. This would continue to protect all zones while allowing traffic to be routed to the provider who responds if the other has an issue.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular physical components, software development tools and code and infrastructure management software may vary depending on the particular system design, while maintaining substantially the same features and functionality and without departing from the scope and spirit of the present invention.

What is claimed is:

1. A fast provisioning system for creating an infrastructure-as-a-service virtual computing platform, comprising:
   a computing machine further comprising:
   a processor;
   a memory associated with the processor;
   a display having a graphical user interface, the display communicatively coupled to the processor and memory; and
   a resource creation module including instructions that, when executed by the processor, causes the computing machine to create a virtual machine for an infrastructure-as-a-service computing platform, the instructions and processor:
   displaying a prompt including a first list further including a plurality of environments for a virtual machine;
   receiving an input for one of the plurality of environments from the first list;
   displaying a prompt including a second list having at least one machine role associated with the one of the plurality of environments for a virtual machine;
   receiving an input from the second list for at least one machine role associated with the one of the plurality of environments for a virtual machine;
   presenting at least one chef role from a repository of chef roles for a virtual machine, the at least one chef role based on the input from the first list for the one of the plurality of environments, and the input from the second list for at least one machine role associated with the one of the plurality of environments for the virtual machine, the first list and the second list being independent from one another; and
   receiving a chef role input and deploying a virtual machine for the infrastructure-as-a-service platform, the chef role including the machine role instructions for creating the virtual computing platform.

2. The fast provisioning system of claim 1 wherein memory includes direct access storage device memory, the fast provisioning system further comprising a workflow module which moves information in the memory from a first physical location to a second physical location.

3. The fast provisioning system of claim 1 further comprising a workflow module that executes a configuration script to configure the virtual machine based on the input for the at least one role and the input for one of the plurality of environments.

4. The fast provisioning system of claim 1 further comprising a workflow module that
displays prompts at the display for other workflows and provides at least one selected property at a request time.

5. The fast provisioning system of claim 4 wherein the workflow module
produces a prompt for moving the virtual machine to a local storage; and
moves the virtual machine to the local storage in response to an input from the prompt for moving the virtual machine.

6. The fast provisioning system of claim 5 wherein the input from the prompt for moving the virtual machine results in a set of criteria for moving the virtual machine, and wherein the workflow module searches for a host computer meeting the set of criteria.

7. The fast provisioning system of claim 4 wherein at least one prompt allows co-location of a host computer and a local storage for the virtual machine.

8. The fast provisioning system of claim 2 further comprising a domain name provisioning module which assigns a domain name to the virtual machine.

9. The fast provisioning system of claim 3 further comprising a domain name provisioning module which assigns a domain name to the virtual machine.

10. The fast provisioning system of claim 3 further comprising a domain name provisioning module which assigns a domain name to a plurality of virtual machines as a batch.

11. The fast provisioning system of claim 3 further comprising a domain name provisioning module which controls a network distance between a client and a cloudbank resident resource.

12. The fast provisioning system of claim 11 wherein the domain name provisioning module includes a set of instructions for load balancing that is applied to control the network distance between the cloudbank and the client.

13. The fast provisioning system of claim 11 wherein the domain name provisioning module includes a set of instructions for instructions that, when executed by the processor, cause the processor to perform the operations of:
receiving a file containing DNS records;
creating secondary zones corresponding to the externally resolvable zones;
setting domain registrar portals;
storing DNS database;
registering new entries to DNS database;
broadcasting new changes to DNS BIND servers; and
routing DNS queries to the live name servers.

14. A method for creating an infrastructure-as-a-service virtual computing platform, comprising:
displaying a prompt including a first list of a plurality of environments for a virtual machine;
receiving an input from the first list for one of the plurality of environments;
displaying a prompt from a second list including at least one machine role associated with the one of plurality of environments for a virtual machine;
receiving an input from the second list for the at least one machine role, the first list and the second list being independent of one another;
presenting at least one chef role from a repository of chef roles for a virtual machine, the at least one chef role based on the input for the one of the plurality of environments, and the input for the one chef role;
receiving a chef role input; and
deploying a virtual machine for the infrastructure-as-a-service platform in response to the chef role input, the chef role including the machine role instructions for creating the virtual computing platform.

15. The method of claim 14 further comprising:
displaying at least one prompt at the display for other workflows; and
passing in the inputs for at least one role and for at least one environment at a request time.

16. The method of claim 14 further comprising:
producing a prompt for moving the virtual machine to a local storage; and
moving the virtual machine to the local storage in response to an input from the prompt for moving the virtual machine.

17. The method of claim 16 further comprising:
wherein the input from the prompt for moving the virtual machine includes a set of criteria for moving the virtual machine, the method further comprising searching for a host computer meeting the set of criteria.

18. The method of claim 17 further wherein the input from the prompt allows co-location of the host computer and local storage for the virtual machine.

19. A fast provisioning system for creating an infrastructure-as-a-service virtual computing platform, comprising:
a computing machine further comprising:
a processor;
a memory associated with the processor;
a display having a graphical user interface, the display communicatively coupled to the processor and memory; and
a resource creation module including instructions that, when executed by the processor, causes the computing machine to create a virtual machine for an infrastructure-as-a-service computing platform, the instructions and processor:
displaying a prompt including a plurality of environments for a virtual machine;
receiving an input for one of the plurality of environments;
displaying a prompt including at least one machine role associated with the one of the plurality of environments for a virtual machine;
receiving an input for the at least one machine role associated with the one of the plurality of environments for a virtual machine, the machine role indicating the type of resource to be deployed;
presenting at least one chef role from a repository of chef roles for a virtual machine, the at least one chef role based on the input for the one of the plurality of environments, and the input for at least one machine role associated with the one of the plurality of environments for the virtual machine; and receiving a chef role input and deploying a virtual machine for the infrastructure-as-a-service platform, the chef role including the machine role instructions for creating the virtual computing platform.

20. The fast provisioning system of claim 19 wherein the role input identifies the code and features for configuring the virtual computing platform, the role also determining the options the virtual computing platform presents to a display.

* * * * *